US012525728B2

(12) United States Patent
Ren et al.

(10) Patent No.: US 12,525,728 B2
(45) Date of Patent: Jan. 13, 2026

(54) ANTENNA APPARATUS AND COMMUNICATION DEVICE

(71) Applicant: HUAWEI TECHNOLOGIES CO., LTD., Guangdong (CN)

(72) Inventors: Chao Ren, Segrate (IT); Dingjiu Daojian, Dongguan (CN); Weihong Xiao, Dongguan (CN); Guoqing Xie, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 174 days.

(21) Appl. No.: 18/423,308

(22) Filed: Jan. 26, 2024

(65) Prior Publication Data

US 2024/0170858 A1 May 23, 2024

Related U.S. Application Data

(63) Continuation of application No. PCT/CN2022/108703, filed on Jul. 28, 2022.

(30) Foreign Application Priority Data

Aug. 10, 2021 (CN) ........................ 202110913828.6

(51) Int. Cl.
*H01Q 9/16* (2006.01)
*H01Q 3/26* (2006.01)
(Continued)

(52) U.S. Cl.
CPC ............... *H01Q 21/26* (2013.01); *H01Q 3/26* (2013.01); *H01Q 15/14* (2013.01)

(58) Field of Classification Search
CPC ............ H01Q 1/24; H01Q 1/246; H01Q 1/48; H01Q 1/50; H01Q 15/14; H01Q 9/16;
(Continued)

(56) References Cited

U.S. PATENT DOCUMENTS 3,858,221 A * 12/1974 Harrison .................. H01Q 3/26 343/846
7,196,674 B2 * 3/2007 Timofeev ............... H01Q 21/24 343/810
(Continued)

FOREIGN PATENT DOCUMENTS

CN 105490006 A 4/2016

*Primary Examiner* — Tho G Phan

(57) ABSTRACT

An antenna apparatus is provided to include a reflection plate, a radiating element disposed on the reflection plate and including a balun and at least two radiation arms, and a feeding network including a phase shifter. The balun includes a first feeding layer, a common ground layer, and a second feeding layer disposed in sequence. The phase shifter includes a feeding member. One end of the common ground layer is electrically connected to one of the radiation arms, and the other end of the common ground layer is electrically connected to the reflection plate. One end of the first feeding layer and one end of the second feeding layer are electrically connected to another one of the radiation arms, the other end of the first feeding layer is electrically connected to the feeding member, and the feeding member and the first feeding layer are an integrated member.

20 Claims, 8 Drawing Sheets

(51) Int. Cl.
*H01Q 15/14* (2006.01)
*H01Q 21/26* (2006.01)

(58) Field of Classification Search
CPC ...... H01Q 19/10; H01Q 19/108; H01Q 21/00; H01Q 21/0081; H01Q 21/08; H01Q 21/26; H01Q 3/26; H01Q 3/32; H01P 1/18; H01P 1/184; H01P 5/10
See application file for complete search history.

(56) References Cited

U.S. PATENT DOCUMENTS

| | | | | |
|---|---|---|---|---|
| 7,692,601 | B2 * | 4/2010 | Bisiules | H01Q 21/24<br>343/803 |
| 7,855,690 | B2 * | 12/2010 | Hook | H01Q 1/38<br>343/820 |
| 8,963,656 | B2 * | 2/2015 | Ali | H01P 5/10<br>333/26 |
| 9,276,323 | B2 * | 3/2016 | Moon | H01Q 21/08 |
| 9,397,404 | B1 * | 7/2016 | McDevitt | H01Q 21/08 |
| 11,652,299 | B2 * | 5/2023 | Livadaru | H01Q 9/285<br>343/702 |

* cited by examiner

ANTENNA APPARATUS AND COMMUNICATION DEVICE

CROSS-REFERENCE TO RELATED APPLICATIONS

This application is a continuation of International Application No. PCT/CN2022/108703, filed on Jul. 28, 2022, which claims priority to Chinese Patent Application No. 202110913828.6, filed on Aug. 10, 2021. The disclosures of the aforementioned applications are hereby incorporated by reference in their entireties.

TECHNICAL FIELD

Embodiments of this application relate to the field of communication antenna technologies, and in particular, to an antenna apparatus and a communication device.

BACKGROUND

With rapid development of wireless communication technologies, a requirement for a capacity of a communication system is increasing, so that a multiple-input multiple-output (MIMO for short) technology and a beamforming array antenna emerge. A conventional base station array antenna includes a plurality of radiating elements and a feeding network. The feeding network has a phase shifter. The feeding network is electrically connected to each radiating element, to implement real-time change of network coverage. In addition, a signal phase is adjusted, to implement electrical downtilt of the array antenna.

In the conventional array antenna, a radiating element includes a plurality of radiation arms and two orthogonally disposed baluns. Each balun includes a common ground layer and feeding layers respectively located on two sides of the common ground layer. One end of the common ground layers of the two baluns is electrically connected to two of the radiation arms. One end of the feeding layers of the two baluns is electrically connected to another two radiation arms, the other end of the feeding layers of the two baluns is electrically connected to a feeding member of the phase shifter. A radio frequency current in a +45° polarization direction is provided for one feeding layer of the two baluns, and a radio frequency current in a −45° polarization direction is provided for another feeding layer of the two baluns. In this way, radio frequency currents in two polarization directions are formed on a radiation surface formed by the radiation arms.

However, during actual application, the feeding member of the phase shifter is connected to a feeding layer of each balun through welding or the like. In this case, assembly between the feeding network and the radiating element becomes complicated, and consequently assembly efficiency of the base station array antenna is reduced.

SUMMARY

Embodiments of this application provide an antenna apparatus and a communication device. This simplifies a connection procedure between a phase shifter of a feeding network and a balun of a radiating element, and therefore improves assembly efficiency of the antenna apparatus.

An embodiment of this application provides an antenna apparatus, including a reflection plate, a radiating element, and a feeding network.

The radiating element is disposed on the reflection plate and includes a balun and at least two radiation arms located at one end of the balun, where the balun includes a first feeding layer, a common ground layer, and a second feeding layer that are disposed in sequence, the balun has only one common ground layer, the feeding network includes a phase shifter, and the phase shifter includes a feeding member.

One end of the common ground layer is electrically connected to one of the radiation arms, and the other end of the common ground layer is electrically connected to the reflection plate, or the other end of the common ground layer is disposed above the reflection plate in a suspended manner. One end of the first feeding layer and one end of the second feeding layer are electrically connected to another one of the radiation arms, and the other end of the first feeding layer is electrically connected to the feeding member, and the feeding member and the first feeding layer are an integrated member.

According to the antenna apparatus provided in this embodiment of this application, the balun is set to include the first feeding layer, the common ground layer, and the second feeding layer that are disposed at intervals in sequence, one end of the first feeding layer and one end of the second feeding layer are electrically connected to the another one of the radiation arms, and the other end of the first feeding layer is electrically connected to the feeding member of the phase shifter. In this way, when the other end of the feeding member and the other end of the second feeding layer each are electrically connected to a corresponding radio frequency signal port, dual-polarized radio frequency signal transmission between the radiation arm and the radio frequency signal port may be implemented by using the balun. For example, in this embodiment of this application, a radio frequency current in a +45° polarization direction may be transmitted to the feeding member of the phase shifter and the first feeding layer in sequence by using the radio frequency signal port, and a radio frequency current in a −45° polarization direction may be transmitted to the second feeding layer by using the radio frequency signal port, so that the at least two radiation arms radiate electromagnetic wave signals in two polarization directions. In addition, the other end of the first feeding layer is electrically connected to the feeding member of the phase shifter. In this way, a phase of an output end of the first feeding layer may be changed by changing a medium layer resistance between the feeding member and a ground of the phase shifter. Therefore, when the antenna apparatus includes a plurality of radiating elements, a phase difference is formed between radiation arms of each radiating element, so that electrical downtilt of an array antenna is implemented. The feeding member of the phase shifter and the first feeding layer are configured as an integrated member, so that not only the phase of the output end of the first feeding layer is adjusted, but also a connection structure between the balun and the phase shifter is simplified. In this way, an assembly procedure between the feeding network and the radiating element is simplified, assembly efficiency of the entire antenna apparatus is improved, and manufacturing costs are reduced.

In an optional implementation, the radiating element has one balun. Compared with a conventional technology, in this embodiment of this application, the balun in the radiating element not only implements a dual-polarized feeding function, but also simplifies a structure of the radiating element, so that an assembly procedure of the entire radiating element is simplified.

In an optional implementation, a first air layer exists between the common ground layer and the first feeding layer, and a second air layer exists between the common ground layer and the second feeding layer.

The first air layer exists between the feeding member and the common ground layer.

In this embodiment of this application, the first air layer is formed between the common ground layer and the first feeding layer that are of the balun, and the second air layer is formed between the common ground layer and the second feeding layer, so that the balun forms an air microstrip structure. This reduces an energy loss of a radio frequency signal caused by a medium layer of the balun, and improves radiation performance of the antenna apparatus. In addition, the first air layer also exists between the feeding member of the phase shifter and the common ground layer, so that the common ground layer of the balun also serves as a signal ground of the phase shifter. In this way, the phase of the output end of the first feeding layer may be adjusted by changing a resistance of the first air layer. In addition, the phase shifter also forms an air microstrip structure, so that an energy loss of the radio frequency signal caused by the feeding network is reduced. Therefore, the radiation performance of the entire antenna apparatus is improved, and manufacturing costs of the balun and the phase shifter are reduced.

In an optional implementation, the phase shifter further includes a sliding medium, and at least a part of the sliding medium is movably disposed on one side that is of the feeding member and that faces the common ground layer.

When sliding relative to the common ground layer, the sliding medium overlaps at least a part of the first air layer.

In this embodiment of this application, the sliding medium is disposed in the phase shifter, and the at least a part of the sliding medium is movably disposed on one side of the feeding member. In this way, the sliding medium is moved to overlap the at least a part of the first air layer, to change a medium resistance of the first air layer, so that stable adjustment on the phase of the output end of the first feeding layer is implemented.

In a feasible implementation, the common ground layer includes a first part and a second part, the first part extends along a direction perpendicular to the reflection plate, and the second part extends along a direction parallel to the reflection plate.

The first air layer includes a first horizontal air layer and a first vertical air layer that are connected to each other, where the first vertical air layer exists between the first feeding layer and the first part. The second air layer includes a second horizontal air layer and a second vertical air layer that are connected to each other, where the second vertical air layer exists between the second feeding layer and the first part.

The first horizontal air layer exists between the feeding member and the second part, and the sliding medium overlaps at least a part of the first horizontal air layer.

In this embodiment of this application, the common ground layer is set to include two parts, the first part is set to extend along the direction perpendicular to the reflection plate, and the second part is set to extend along the direction parallel to the reflection plate. The first vertical air layer is formed between the first feeding layer and the first part of the common ground layer, and the first horizontal air layer is formed between the feeding member of the phase shifter and the second part of the common ground layer. In this way, moving the sliding medium to enable the sliding medium to overlap the first horizontal air layer can not only adjust a signal phase of a corresponding radiating element, but also properly arrange the air microstrip structure of the balun and the air microstrip structure of the phase shifter. Moreover, space of the antenna apparatus in the direction perpendicular to the reflection plate is saved, and structural stability between the feeding network and the radiating element is further improved.

In a feasible implementation, the antenna apparatus includes a plurality of radiating elements, and the plurality of radiating elements are disposed at intervals on the reflection plate.

For the plurality of radiating elements disposed along the extension direction of the second part, second parts of two adjacent common ground layers are an integrated member.

In this embodiment of this application, the plurality of radiating elements are disposed at intervals on the reflection plate, so that the antenna apparatus in this embodiment of this application forms an array antenna. Each radiating element is electrically connected to the phase shifter of the feeding network, so that a phase difference is formed between the radiating elements. This implements electrical downtilt of the array antenna. In addition, second parts of two adjacent common ground layers are configured as an integrated member, so that all common ground layers of the antenna apparatus are an integrated member. In this way, when each radiating element of the antenna apparatus is ensured to be grounded, the structure of the radiating element in the antenna apparatus is simplified, so that the assembly efficiency of the antenna apparatus is improved.

In a feasible implementation, the feeding network includes a first phase shifter and a second phase shifter, the first phase shifter includes a first feeding member, and the second phase shifter includes a second feeding member.

The first feeding member and the first feeding layer are an integrated member, and the first air layer exists between the first feeding member and the common ground layer. The second feeding member and the second feeding layer are an integrated member, and the second air layer exists between the second feeding member and the common ground layer.

In this embodiment of this application, two phase shifters are disposed to adjust signal phases in both two polarization directions, where the first phase shifter is configured to change the phase of the output end of the first feeding layer, and the second phase shifter is configured to change a phase of an output end of the second feeding layer. In addition, a feeding member of the first phase shifter and the first feeding layer are configured as an integrated member, and a feeding member of the second phase shifter and the second feeding layer are configured as an integrated member. This further simplifies a connection procedure between the two phase shifters and the balun, and therefore improves the assembly efficiency of the antenna apparatus.

In a feasible implementation, the first feeding member is a first feeding plate, and the second feeding member is a second feeding plate. The first feeding plate and the first feeding layer are located on a first plane, and the second feeding plate and the second feeding layer are located on a second plane. The first plane and the second plane each are perpendicular to the reflection plate of the antenna apparatus.

In this embodiment of this application, a feeding member is configured as a feeding plate. For example, the first feeding member is configured as the first feeding plate, and the second feeding member is configured as the second feeding plate. The feeding member and a corresponding feeding layer are disposed on a same plane. This simplifies a manufacturing procedure of integrally forming the feeding member and the corresponding feeding layer. In other words, manufacturing difficulty of integrally forming the feeding member and the corresponding feeding layer is reduced, so that manufacturing efficiency of the antenna apparatus is improved. In addition, the first plane on which the first feeding member is located and the second plane on which the second feeding member is located each are perpendicular to a surface of the reflection plate, to avoid a case in which the first feeding member and the second feeding member are respectively coupled with the surface of the reflection plate, affecting transmission performance of the radio frequency signal.

In a feasible implementation, the antenna apparatus further includes a conductive housing having an opening on one side, the reflection plate has a through hole, the conductive housing is embedded in the through hole, the opening faces the radiation arm, one end of the balun is connected to the radiation arm, and the other end of the balun is accommodated in the conductive housing.

That the other end of the common ground layer is electrically connected to the reflection plate includes: The other end of the common ground layer is electrically connected to the conductive housing, and the conductive housing is electrically connected to the reflection plate.

In this embodiment of this application, the conductive housing is embedded in the through hole of the reflection plate, and a part of the balun is accommodated in the conductive housing, so that a part of an electromagnetic wave signal radiated to the outside by the balun can be blocked by the conductive housing, and does not leak to the outside. This reduces a loss of the balun in a radio frequency signal transmission process. Particularly, when a part of the phase shifter at one end of the balun is accommodated in the conductive housing, a loss of the phase shifter in the radio frequency signal transmission process is further reduced, and accuracy of phase adjustment performed by the phase shifter is improved. In addition, the conductive housing is electrically connected to the reflection plate, and one end of the common ground layer of the balun is connected to the conductive housing. This implements an electrical connection between the common ground layer and the reflection plate, so that the common ground layer is ensured to be grounded.

In a feasible implementation, the balun includes an insulating body and three layers of sheet metal.

The three layers of sheet metal are disposed at intervals, and the insulating body exists between two adjacent layers of sheet metal.

One layer of sheet metal located in the middle is the common ground layer, and two layers of sheet metal located on two sides are respectively the first feeding layer and the second feeding layer.

In this embodiment of this application, the balun is manufactured by using three layers of sheet metal. Compared with a manufacturing manner of a printed circuit board, a cable, or a photolithography and etching process (PEP for short), this effectively reduces manufacturing costs of a balun structure, and enables a manufacturing procedure of the balun to be simpler and faster.

In a feasible implementation, there are a plurality of radiating elements, and the plurality of radiating elements are arranged in an array. The phase shifter includes a plurality of feeding members, and the plurality of feeding members are disposed in a one-to-one correspondence with baluns of the plurality of radiating elements.

In this embodiment of this application, the phase shifter is set to include a plurality of feeding members, and the plurality of feeding members are connected to baluns of corresponding radiating elements. In this way, phases of the plurality of radiating elements can be adjusted by using one phase shifter. For example, a phase difference is formed between the plurality of radiating elements by using one phase shifter, so that electrical downtilt of each radiating element in the antenna apparatus is implemented. This not only ensures the radiation performance of the antenna apparatus, but also simplifies a structure of the feeding network, so that a structure layout of the entire feeding network is simpler and more reliable.

An embodiment of this application further provides a communication device, including a radio frequency circuit and the foregoing antenna apparatus.

According to the communication device provided in this embodiment of this application, the radio frequency circuit is electrically connected to the antenna apparatus, so that a structure of the antenna apparatus is simplified, assembly efficiency of the entire antenna apparatus is improved, and manufacturing costs are reduced.

DESCRIPTIONS OF REFERENCE NUMERALS

1 and 100: reflection plate; 2 and 200: radiating element; 300: feeding network; 400: conductive housing; 500: gap;

110: through hole; 200*a*: first radiating element; 200*b*: second radiating element; 200*c*: third radiating element; 22 and 210: radiation arm; 21 and 220: balun; 310: phase shifter; 320: main feeding line; 410: main body part; 420: connection part; 430: opening;

22*a* and 211: first radiation arm; 22*b* and 212: second radiation arm; 22*c* and 213: third radiation arm; 22*d* and 214: fourth radiation arm; 21*a* and 220*a*: first balun; 21*b* and 220*b*: second balun; 220*c*: third balun; 201 and 221: common ground layer; 202 and 222: first feeding layer; 203 and 223: second feeding layer; 224: first air layer; 225: second air layer; 226: mounting part; 227: extension part; 3101: first phase shifter; 3102: second phase shifter; 31 and 311: feeding member; 312: sliding medium; and

2211: first part; 2212: second part; 2241: first vertical air layer; 2242: first horizontal air layer; 2251: second vertical air layer; 2252: second horizontal air layer; 226*a*: first mounting part; 226*b*: second mounting part; 3111: first feeding member; 3112: second feeding member; 3121: first sliding medium; and 3122: second sliding medium.

DESCRIPTION OF EMBODIMENTS

Terms used in embodiments of this application are only used to explain specific embodiments of this application, but are not intended to limit this application.

Figure 1:
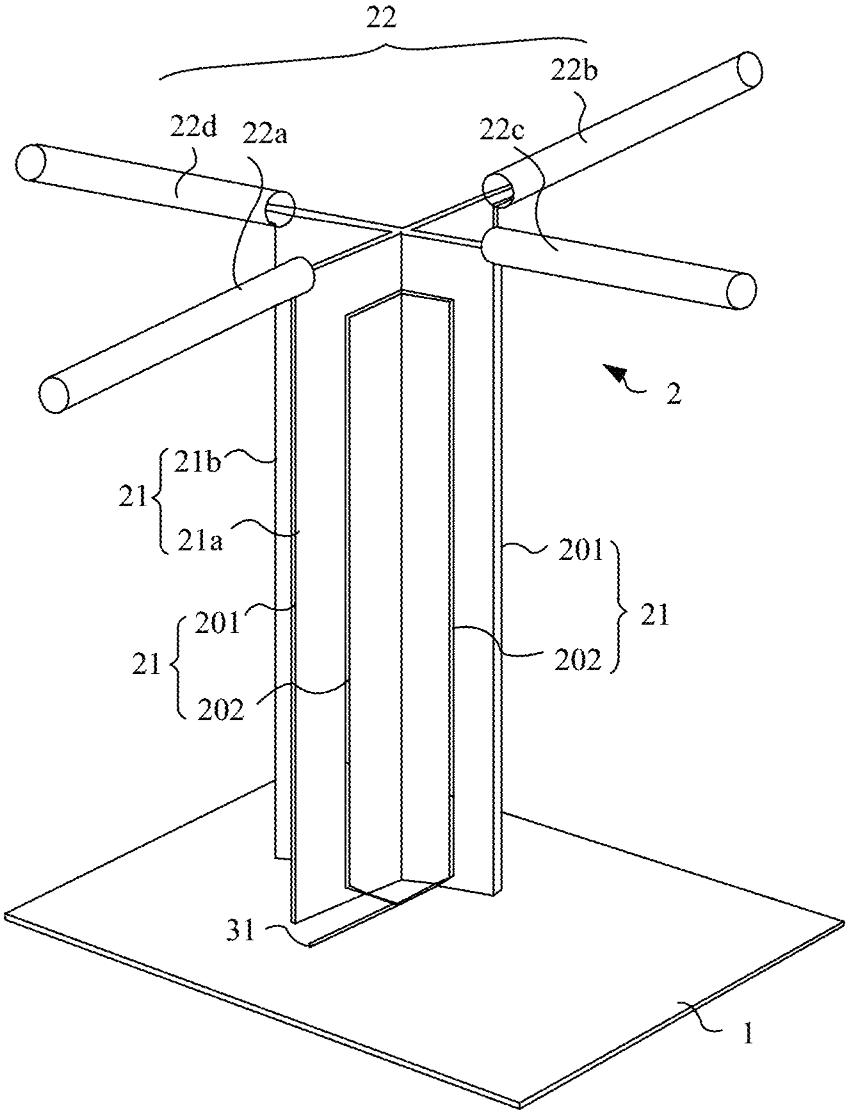
FIG. 1 is a schematic diagram of a partial structure of a conventional base station array antenna.

FIG. 1 is a schematic diagram of a partial structure of a conventional base station array antenna. Refer to FIG. 1. Currently, the conventional base station array antenna mainly includes a feeding network (where a feeding member 31 shown in FIG. 1 is a part of the feeding network) and a plurality of radiating elements 2 (where one radiating element is shown in FIG. 1), and the plurality of radiating elements 2 are arranged in an array on one surface of a reflection plate 1. The feeding network is electrically connected to each radiating element 2, to implement real-time change of network coverage, meet ever-changing coverage scenarios, and achieve optimal network performance.

Refer to FIG. 1. The radiating element 2 includes a balun 21 and a radiation arm 22. One end of the balun 21 is connected to the radiation arm 22, and the other end of the balun 21 is disposed on the one surface of the reflection plate 1. There may be two baluns 21, and specifically, a first balun 21*a* and a second balun 21*b* are included. There may be four radiation arms 22, and specifically, a first radiation arm 22*a*, a second radiation arm 22*b*, a third radiation arm 22*c*, and a fourth radiation arm 22*d* are included.

The first balun 21*a* and the second balun 21*b* are disposed orthogonally. The first radiation arm 22*a* and the second radiation arm 22*b* are respectively disposed at one end of the first balun 21*a*. Correspondingly, the third radiation arm 22*c* and the fourth radiation arm 22*d* are respectively disposed at one end of the second balun 21*b*. The first radiation arm 22*a* and the second radiation arm 22*b* may serve as a first dipole, and the third radiation arm 22*c* and the fourth radiation arm 22*d* may serve as a second dipole.

Figure 2:
FIG. 2 is a schematic diagram of an internal structure of one balun in FIG. 1.

FIG. 2 is a schematic diagram of an internal structure of one balun in FIG. 1. Refer to FIG. 2. Each balun 21 includes two feeding layers and a common ground layer 201 located between the two feeding layers. The two feeding layers may be a first feeding layer 202 and a second feeding layer 203 respectively. The first feeding layer 202, the common ground layer 201, and the second feeding layer 203 are disposed at intervals along a thickness direction of the balun 21 (a direction indicated by an arrow z in FIG. 2).

Refer to FIG. 1. During disposition, one end of a common ground layer 201 of the first balun 21*a* is separately connected to the first radiation arm 22*a* and the second radiation arm 22*b*, one end of a common ground layer 201 of the second balun 21*b* is separately electrically connected to the third radiation arm 22*c* and the fourth radiation arm 22*d*, and the other end of the two common ground layers 201 is electrically connected to the one surface of the reflection plate 1, to ensure that the radiating element 2 is grounded.

Still refer to FIG. 1. The feeding network includes a phase shifter, and the phase shifter has the feeding member 31. One end of a first feeding layer 202 of the first balun 21*a* is separately connected to the first radiation arm 22*a* in a coupled feeding manner, one end of a first feeding layer 202 of the second balun 21*b* is connected to the third radiation arm 22*c* in a coupled feeding manner, and the other end of the two first feeding layers 202 is electrically connected to one end of the feeding member 31 of the phase shifter. Another end of the feeding member 31 of the phase shifter is electrically connected to a first radio frequency signal port (not shown).

Correspondingly, a second feeding layer 203 of the first balun 21*a* is connected to the second radiation arm 22*b* in a coupled feeding manner, a second feeding layer 203 of the second balun 21*b* is connected to the fourth radiation arm 22*d* in a coupled feeding manner, and the other end of the two second feeding layers 203 is electrically connected to a second radio frequency signal port (not shown).

The following uses an example in which the first radio frequency signal port and the second radio frequency signal port respectively send a radio frequency current in a +45° polarization direction and a radio frequency current in a −45° polarization direction. During specific operation, the radio frequency current in the +45° direction is input to the two first feeding layers 202 by using the first radio frequency signal port and the feeding member 31 of the phase shifter, and the radio frequency current in the −45° direction is input to the two second feeding layers 203 by using the second radio frequency signal port. In this way, polarization components are generated in an extension direction of the first dipole and an extension direction of the second dipole, and finally, radio frequency signals in opposite polarization directions are respectively excited at +45° and −45° in a coordinate system formed by the first dipole and the second dipole.

In addition, one end of the two first feeding layers 202 is electrically connected to a feeding member 31 of a phase shifter, to adjust phases of output ends of the two first feeding layers 202, to change a phase of an output end of the radiating element 2. In this way, a signal phase difference is formed between the plurality of radiating elements 2, and electrical downtilt of an array antenna is implemented.

It should be noted that, in the conventional technology, a signal ground of the phase shifter is the reflection plate 1. The feeding member 31 of the phase shifter and the reflection plate 1 are disposed opposite and spaced from each other. The feeding member 31, the reflection plate 1, and a medium layer between the feeding member 31 and the reflection plate 1 jointly form a signal transmission line of the phase shifter. When the phase shifter works, a medium layer resistance between the feeding member 31 and the reflection plate 1 is changed, to change the phase of the output end of the radiating element 2.

Usually, the feeding member 31 of the phase shifter is electrically connected to the two first feeding layers 202 in a connection manner such as welding. In addition, a main surface of the feeding member 31 is disposed in parallel with the reflection plate 1, and a main surface of a feeding layer of the balun 21, for example, the first feeding layer 202, is disposed perpendicular to the reflection plate 1, so that the feeding member 31 and the feeding layer are perpendicular on different surfaces. This increases difficulty of welding between the feeding member 31 and the feeding layer. For example, the welding between the feeding member 31 and the first feeding layer 202 needs to be performed by using a mold, and a welding parameter needs to be strictly adjusted. As a result, assembly between the phase shifter in the feeding network and the balun 21 in the radiating element 2 becomes complicated, and assembly efficiency of a base station array antenna is reduced.

Based on this, embodiments of this application provide an antenna apparatus and a communication device. A feeding layer of a balun and a feeding member of a phase shifter are configured as an integrated member, to implement integration of a remote electrical tilt feeding network and a radiating element, simplify an assembly procedure between the feeding network and the radiating element, and improve assembly efficiency of the entire antenna apparatus.

The following describes in detail specific structures of the antenna apparatus and the communication device in embodiments of this application.

Embodiment 1

Figure 3:
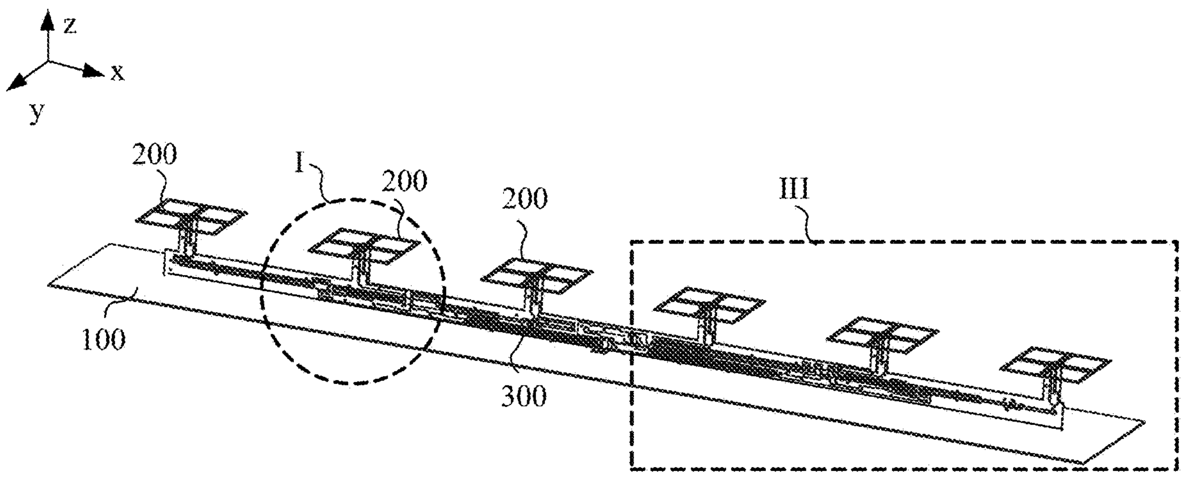
FIG. 3 is a schematic diagram of a structure of an antenna apparatus according to an embodiment of this application.

FIG. 3 is a schematic diagram of a structure of an antenna apparatus according to an embodiment of this application. Refer to FIG. 3. This embodiment of this application provides an antenna apparatus, including a reflection plate 100, a radiating element 200, and a feeding network 300. The radiating element 200 is disposed on one surface of the reflection plate 100. In this way, receiver sensitivity for an antenna signal may be improved by using the reflection plate 100. In addition, the reflection plate 100 also blocks and shields an electromagnetic wave from another surface of the radiating element 200, so that an anti-interference capability of the radiating element 200 in receiving signals is improved. One end of the feeding network 300 is electrically connected to the radiating element 200, and the other end of the feeding network 300 is electrically connected to a radio frequency signal port (not shown in the figure). In this way, radio frequency signal transmission between the radiating element 200 and the radio frequency signal port may be implemented by using the feeding network 300.

It may be understood that the radio frequency signal transmission includes transmitting or receiving of a radio frequency signal. Certainly, the radio frequency signal transmission may alternatively include transmitting and receiving of a radio frequency signal. For example, the radio frequency signal port may be configured to send or receive a radio frequency signal.

When the antenna apparatus serves as a transmitting antenna apparatus, the radio frequency signal port is a radio frequency signal source for sending a radio frequency signal. When the antenna apparatus serves as a receiving antenna apparatus, the radio frequency signal port is a radio frequency signal receiving end for receiving a radio frequency signal.

During actual application, the radio frequency signal port is usually located in a remote radio unit (RRU for short) in a communication device such as a base station device.

It may be understood that there may be one or more radiating elements 200 (as shown in FIG. 3). When there are a plurality of radiating elements 200, the plurality of radiating elements 200 may be arranged in an array at intervals on the one surface of the reflection plate 100. In this way, the antenna apparatus in this embodiment of this application is an array antenna apparatus. For example, the plurality of radiating elements 200 are disposed at intervals along an extension direction (refer to an x direction in FIG. 3) of the reflection plate 100.

Refer to FIG. 3. For ease of description, the extension direction of the reflection plate 100 is represented by the x direction, a width direction of the reflection plate 100 is represented by a y direction, and a direction perpendicular to the reflection plate 100 is represented by a z direction.

The following specifically uses one radiating element 200 as an example to describe a structure of the antenna apparatus.

Figure 4:
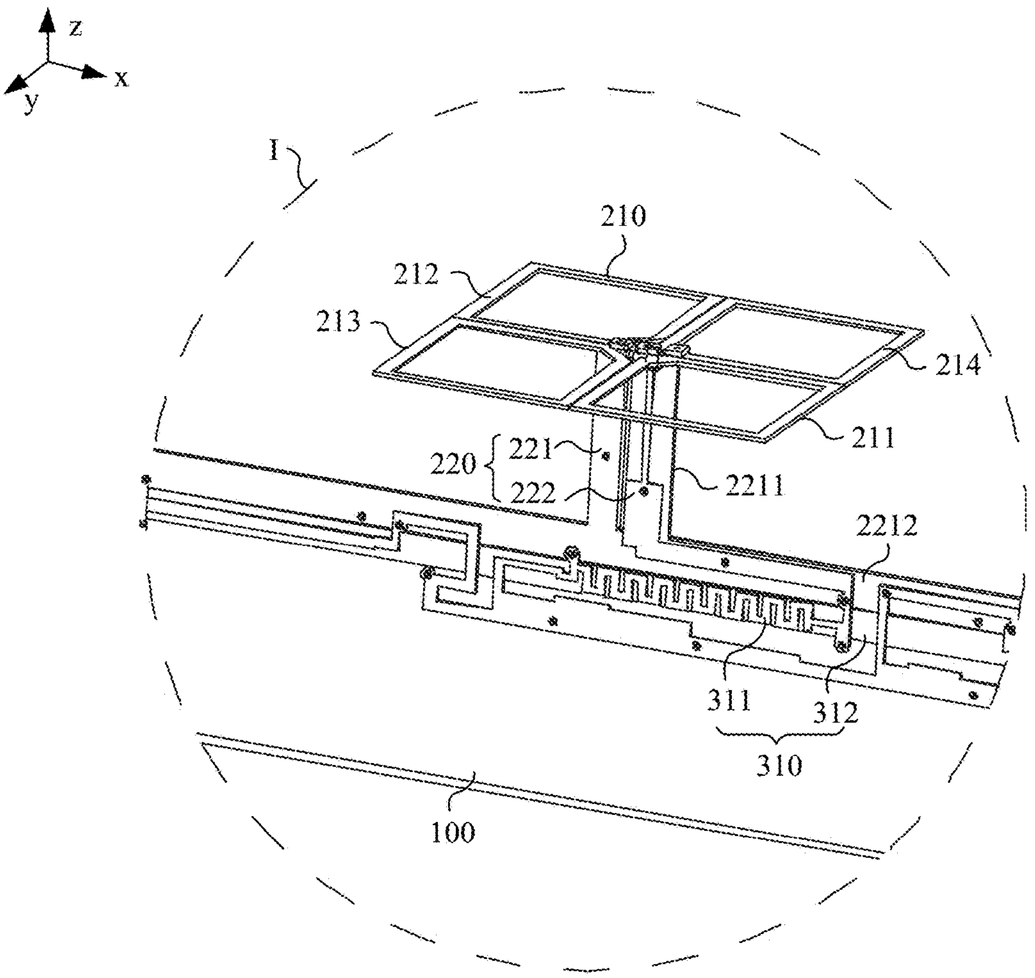
FIG. 4 is a partially enlarged view of a location I in FIG. 3.

FIG. 4 is a partially enlarged view of a location I in FIG. 3. Refer to FIG. 4. In the antenna apparatus in this embodiment of this application, the radiating element 200 includes a balun 220 and a radiation arm 210. One end of the balun 220 is disposed on the radiation arm 210, and the other end of the balun 220 is disposed on one surface of the reflection plate 100. In other words, the balun 220 is located between the radiation arm 210 and the reflection plate 100.

It should be noted that the radiating element 200 in this embodiment of this application has one balun 220.

For ease of description in the following, the end that is of the balun 220 and that is connected to the radiation arm 210 serves as a first end of the balun 220, and the end that is of the balun 220 and that is connected to the reflection plate 100 serves as a second end of the balun 220. In this case, a height direction of the balun 220 is a direction from the first end to the second end of the balun 220. Refer to FIG. 4. It may be understood that, an angle between the height direction of the balun 220 and the reflection plate 100 may be 90°. In other words, the height direction of the balun 220 is parallel to the z direction. Certainly, in some examples, an angle between the height direction of the balun 220 and the reflection plate 100 may be an acute angle. In other words, an angle between the height direction of the balun 220 and the z direction is an acute angle. In this embodiment of this application, an example in which the height direction of the balun 220 is parallel to the z direction is specifically used for description.

The radiation arm 210 in the radiating element 200 is configured to radiate an electromagnetic wave signal or is configured to receive an electromagnetic wave signal. There are at least two radiation arms 210, and the at least two radiation arms 210 each are disposed at the first end of the balun 220. For example, the radiating element 200 has two radiation arms 210, and the two radiation arms 210 may be disposed orthogonally at the first end of the balun 220. In this way, one of the radiation arms 210 may serve as a first dipole, and the other radiation arm 210 may serve as a second dipole. It should be noted that the two radiation arms 210 are insulated. For example, overlapping parts of the two radiation arms 210 along the z direction are electrically isolated by using an insulating material.

Figure 5:
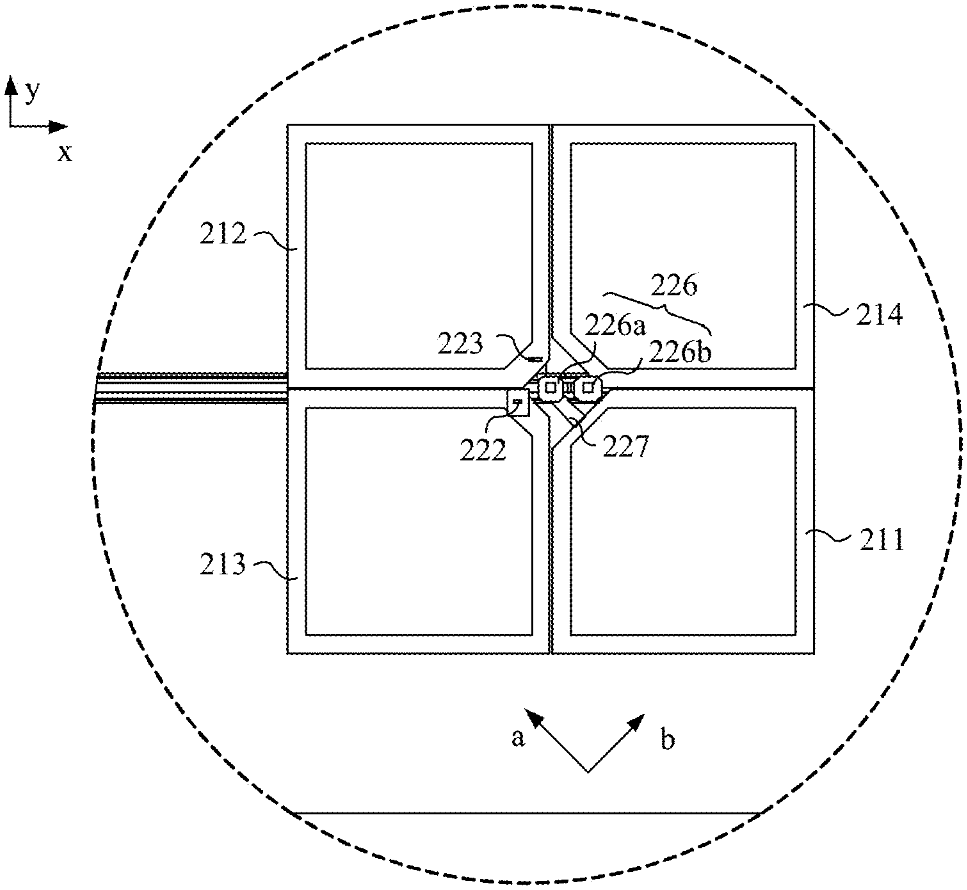
FIG. 5 is a top view of FIG. 4.

FIG. 5 is a top view of FIG. 4. Refer to FIG. 5. For another example, the radiating element 200 may alternatively include four radiation arms 210. Two radiation arms 210 are disposed at an interval in an a direction, and other two radiation arms 210 are disposed at an interval in a b direction. The a direction and the b direction are perpendicular to each other. In this way, the two radiation arms 210 in the a direction may serve as a first dipole, and the two radiation arms 210 in the b direction may serve as a second dipole.

During actual application, a plane on which each radiation arm 210 is located is parallel to the reflection plate 100. In other words, each radiation arm 210 is parallel to an x-y plane. In addition, all the radiation arms 210 in the radiating element 200 in this embodiment of this application are located on a same plane.

The following specifically uses an example in which the radiating element 200 has four radiation arms 210 for description.

Refer to FIG. 5. For ease of description, in this embodiment of this application, the four radiation arms 210 of the radiating element 200 respectively serve as a first radiation arm 211, a second radiation arm 212, a third radiation arm 213, and a fourth radiation arm 214. The first radiation arm 211 and the second radiation arm 212 are disposed at an interval in the a direction, and serve as the first dipole. The third radiation arm 213 and the fourth radiation arm 214 are disposed at an interval in the b direction, and serve as the second dipole.

Figure 6:
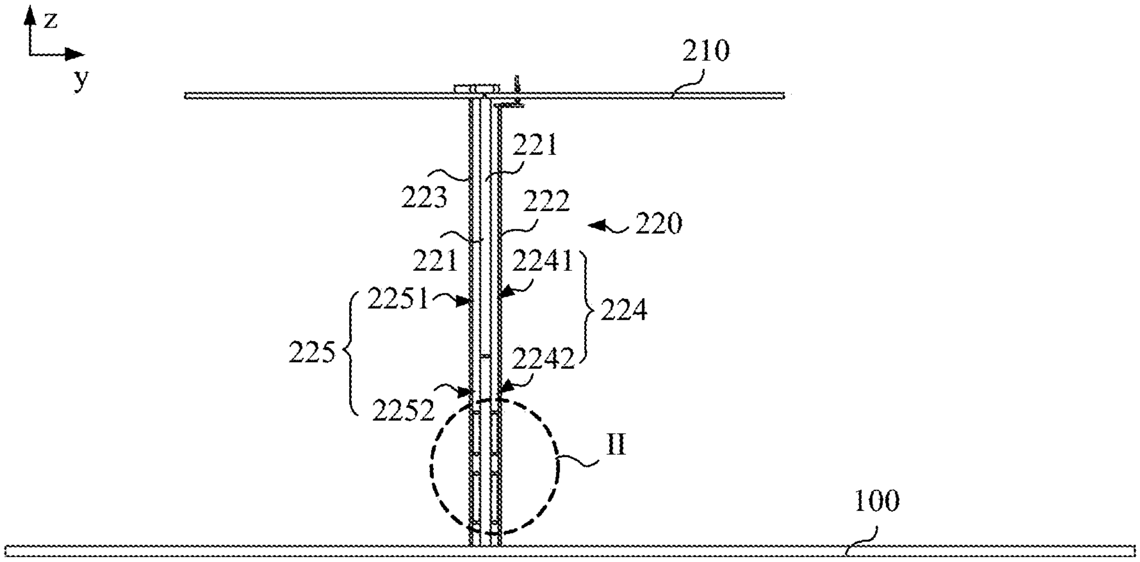
FIG. 6 is a left view of FIG. 3.

FIG. 6 is a left view of FIG. 3. Refer to FIG. 4 and FIG. 6. The balun 220 includes a first feeding layer 222, a common ground layer 221, and a second feeding layer 223 that are disposed in sequence (as shown in FIG. 6). For example, the balun 220 includes the first feeding layer 222, the common ground layer 221, and the second feeding layer 223 that are disposed along a first direction in sequence. In other words, the first feeding layer 222 and the second feeding layer 223 are respectively disposed on two sides of the common ground layer 221 along the first direction. The balun 220 of the radiating element 200 has only one common ground layer 221.

Refer to FIG. 6. It should be noted that the first direction may be considered as a thickness direction of the balun 220, and the thickness direction is perpendicular to the height direction of the balun 220. For example, the first direction (namely, the thickness direction) may be the x direction, or may be the y direction. In this embodiment of this application, an example in which the first direction is the y direction is specifically used for description.

During actual application, the first feeding layer 222 (as shown in FIG. 4) and the second feeding layer 223 (where the second feeding layer 223 is not shown in FIG. 4) each are a sheet member having a specific width. For example, a width direction of the first feeding layer 222 and a width direction of the second feeding layer 223 are the x direction, and a height direction of the first feeding layer 222 and a height direction of the second feeding layer 223 are the z direction. In this embodiment of this application, the common ground layer 221 of the balun 220 is also a sheet member, and a width direction of the common ground layer 221 is also the x direction, and a height direction of the common ground layer 221 is the z direction.

It may be understood that the first feeding layer 222 and the common ground layer 221 are insulated, and the second feeding layer 223 and the common ground layer 221 are insulated, to ensure that the first feeding layer 222, the common ground layer 221, and the second feeding layer 223 are not short-circuited. For example, the first feeding layer 222 is electrically isolated from the common ground layer 221 by using a plastic layer. Correspondingly, the second feeding layer 223 is electrically isolated from the common ground layer 221 by using a plastic layer. Certainly, the feeding layers (namely, the first feeding layer 222 and the second feeding layer 223) may be electrically isolated from the common ground layer 221 by using another insulating material. The insulating material is not limited herein.

Still refer to FIG. 4 and FIG. 6. One end of the common ground layer 221 is electrically connected to one of the radiation arms 210, and the other end of the common ground layer 221 is electrically connected to the reflection plate 100. For example, a first end of the common ground layer 221 is electrically connected to one of the radiation arms 210, and a second end of the common ground layer 221 is electrically connected to the reflection plate 100. The first end and the second end of the common ground layer 221 are two ends that are of the common ground layer 221 and that are disposed opposite to each other along the height direction (for example, the z direction) of the common ground layer 221. The first end of the common ground layer 221 is one end close to the radiation arm 210, and the second end of the common ground layer 221 is one end close to a reflection plate 100.

During actual application, the reflection plate 100 is a reference ground. The second end of the common ground layer 221 of the balun 220 is electrically connected to the reflection plate 100, and the first end of the common ground layer 221 is electrically connected to one of the radiation arms 210, to ensure that the radiation arm 210 is grounded.

During specific disposition, the first end of the common ground layer 221 may be electrically connected to one radiation arm 210 corresponding to the first dipole, may be electrically connected to one radiation arm 210 corresponding to the second dipole, or may be electrically connected to both one radiation arm 210 corresponding to the first dipole and one radiation arm 210 corresponding to the second dipole.

Refer to FIG. 5. For example, the first end of the common ground layer 221 may be electrically connected to the first radiation arm 211 and the fourth radiation arm 214 by using a mounting part 226. Specifically, by using an extension part 227, a first mounting part **226*a* may be connected to one side that is of the first radiation arm 211 and that faces the second radiation arm 212. A second mounting part 226*b* may be connected to one side that is of the fourth radiation arm 214 and that faces the third radiation arm 213. A part of the first end of the common ground layer 221 is connected to the first mounting part 226*a*, and another part of the first end of the common ground layer 221 is connected to the second mounting part 226*b*, so that the first end of the common ground layer 221 is electrically connected to both the first radiation arm 211 and the fourth radiation arm 214**.

It may be understood that both the mounting parts 226 (namely, the first mounting part **226*a* and the second mounting part 226*b*) and the extension part 227 are conductive members, so that the first end of the common ground layer 221 is electrically connected to both the first radiation arm 211 and the fourth radiation arm 214**.

Refer to FIG. 5. One end of the first feeding layer 222 and one end of the second feeding layer 223 are electrically connected to another radiation arm 210, and the other end of the first feeding layer 222 and the other end of the second feeding layer 223 are electrically connected to a corresponding radio frequency signal port. For example, a first end of the first feeding layer 222 and a first end of the second feeding layer 223 are electrically connected to the another radiation arm 210, and a second end of the first feeding layer 222 and a second end of the second feeding layer 223 are electrically connected to the corresponding radio frequency signal port.

Refer to FIG. 6. The first end and the second end of the first feeding layer 222 are respectively two ends that are of the first feeding layer 222 and that are disposed opposite to each other along the height direction (for example, the z direction) of the balun 220. The first end of the first feeding layer 222 is close to the radiation arm 210, and the second end of the first feeding layer 222 is far away from the radiation arm 210. Similarly, the first end and the second end of the second feeding layer 223 are respectively two ends that are of the second feeding layer 223 and that are disposed opposite to each other along the height direction (for example, the z direction) of the balun 220. In addition, the first end of the second feeding layer 223 is close to the radiation arm 210, and the second end of the second feeding layer 223 is far away from the radiation arm 210.

During specific disposition, the first end of the first feeding layer 222 may be electrically connected to one of the radiation arms 210 of the first dipole, and correspondingly, the first end of the second feeding layer 223 is electrically connected to one of the radiation arms 210 of the second dipole. For example, the first end of the first feeding layer 222 is electrically connected to the first radiation arm 211, and the first end of the second feeding layer 223 is electrically connected to the third radiation arm 213. Alternatively, refer to FIG. 5. The first end of the first feeding layer 222 is electrically connected to the third radiation arm 213, and the first end of the second feeding layer 223 is electrically connected to the second radiation arm 212. Alternatively, the first end of the first feeding layer 222 is electrically connected to the second radiation arm 212, and the first end of the second feeding layer 223 is electrically connected to the third radiation arm 213.

It should be noted herein that the first end of the common ground layer 221 and the first ends of the feeding layers (the first feeding layer 222 and the second feeding layer 223) need to be electrically connected to different radiation arms 210, to avoid a short circuit of the radiation arm 210. Refer to FIG. 5. For example, when the first end of the common ground layer 221 is electrically connected to the first radiation arm 211 and the fourth radiation arm 214, the first end of the first feeding layer 222 is electrically connected to the third radiation arm 213, and the first end of the second feeding layer 223 is electrically connected to the second radiation arm 212.

For another example, when the first end of the common ground layer 221 is electrically connected to the second radiation arm 212 and the third radiation arm 213, the first end of the first feeding layer 222 is electrically connected to the first radiation arm 211, and the first end of the second feeding layer 223 is electrically connected to the fourth radiation arm 214.

Refer to FIG. 6. It may be understood that the first end of the first feeding layer 222 may be directly electrically connected to the radiation arm 210, or may be disposed at an interval from the radiation arm 210, so that the first end of the first feeding layer 222 is connected to the radiation arm 210 in a coupled feeding manner. Similarly, the first end of the second feeding layer 223 may be directly electrically connected to the radiation arm 210, or may be disposed at an interval from the radiation arm 210, so that the first end of the second feeding layer 223 is connected to the radiation arm 210 in a coupled feeding manner.

Refer to FIG. 6. For example, the first end of the first feeding layer 222 is directly electrically connected to the third radiation arm 213, and the first end of the second feeding layer 223 is directly electrically connected to the second radiation arm 212. The first end of the first feeding layer 222 is led out of an upper surface of the third radiation arm 213, and the first end of the second feeding layer 223 is located on a lower surface of the second radiation arm 212.

It should be noted that, upper surfaces of the radiation arms 210 (for example, the third radiation arm 213 and the second radiation arm 212) are surfaces that are of the radiation arms 210 and that are away from the reflection plate 100, and lower surfaces of the radiation arms 210 are surfaces that are of the radiation arms 210 and that face the reflection plate 100.

In addition, during actual application, there are two radio frequency signal ports for implementing dual-polarized feeding. The two radio frequency signal ports are respectively a first radio frequency signal port and a second radio frequency signal port.

For example, the first radio frequency signal port is configured to send or receive a radio frequency signal in a +45° polarization direction, and the second radio frequency signal port is configured to send or receive a radio frequency signal in a −45° polarization direction. The second end of the first feeding layer 222 is electrically connected to the first radio frequency signal port, so that the first feeding layer 222 is configured to transmit the radio frequency signal in the +45° polarization direction. The second end of the second feeding layer 223 is electrically connected to the second radio frequency signal port, so that the second feeding layer 223 is configured to transmit the radio frequency signal in the −45° polarization direction.

Certainly, in some examples, the second end of the first feeding layer 222 may be electrically connected to the second radio frequency signal port, so that the first feeding layer 222 is configured to transmit the radio frequency signal in the −45° polarization direction. The second end of the second feeding layer 223 is electrically connected to the first radio frequency signal port, so that the second feeding layer 223 is configured to transmit the radio frequency signal in the +45° polarization direction.

In this embodiment of this application, an example in which the first feeding layer 222 is configured to transmit the radio frequency signal in the +45° polarization direction, and the second feeding layer 223 is configured to transmit the radio frequency signal in the −45° polarization direction is specifically used for description.

Refer to FIG. 4 to FIG. 6. In this embodiment of this application, dual-polarized radio frequency signal transmission between the radiation arm 210 and the radio frequency signal port is implemented by using the balun 220. For example, when the radio frequency signal port is the radio frequency signal source, the first radio frequency signal port feeds the radio frequency signal in the +45° polarization direction to the third radiation arm 213 by using the first feeding layer 222 in the balun 220. In addition, because the third radiation arm 213 and the fourth radiation arm 214 are disposed at an interval, an electromagnetic wave emitted by the third radiation arm 213 excites a radio frequency current on the fourth radiation arm 214, so that the radio frequency signal in the +45° polarization direction is generated on the first dipole. The second radio frequency signal port feeds the radio frequency signal in the −45° polarization direction to the second radiation arm 212 by using the second feeding layer 223 in the balun 220. In addition, because the second radiation arm 212 and the first radiation arm 211 are disposed at an interval, an electromagnetic wave emitted by the second radiation arm 212 excites a radio frequency current on the first radiation arm 211, so that the radio frequency signal in the −45° polarization direction is generated on the second dipole. In this way, a radiation surface formed by the four radiation arms 210 radiates electromagnetic wave signals in two polarization directions.

It can be learned from the foregoing descriptions that, compared with a conventional technology, in this embodiment of this application, the balun 220 in the radiating element 200 not only implements a dual-polarized feeding function, but also simplifies a structure of the radiating element 200 by disposing only one balun 220 in the radiating element 200, so that an assembly procedure of the entire radiating element 200 is simplified.

During specific disposition, the balun 220 in this embodiment of this application includes an insulating body (not shown in the figure) and three layers of sheet metal. The insulating body is disposed between the radiation arm 210 and the reflection plate 100, and the three layers of sheet metal are disposed at intervals. The insulating body exists between two adjacent layers of sheet metal, and the insulating body serves as an insulating medium between the three layers of sheet metal. One layer of sheet metal located in the middle is the common ground layer 221, and two layers of sheet metal located on two sides are respectively the first feeding layer 222 and the second feeding layer 223.

In this embodiment of this application, the balun 220 is manufactured by using three layers of sheet metal. Compared with a manufacturing manner of a printed circuit board, a cable, or a photolithography and etching process (PEP for short), this effectively reduces manufacturing costs of the balun 220, and enables a manufacturing procedure of the balun 220 to be simpler and faster.

Refer to FIG. 4 and FIG. 6. A phase shifter 310 includes a feeding member 311. One end of the feeding member 311 is electrically connected to the second end of the first feeding layer 222, and the other end of the feeding member 311 is electrically connected to the first radio frequency signal port, so that the second end of the first feeding layer 222 is electrically connected to the first radio frequency signal port by using the feeding member 311. In this way, a radio frequency current in the +45° polarization direction may be transmitted to the feeding member 311 of the phase shifter 310 and the first feeding layer 222 in sequence by using the first radio frequency signal port, and a radio frequency current in the −45° polarization direction may be transmitted to the second feeding layer 223 by using the second radio frequency signal port, so that at least two radiation arms 210 (for example, four radiation arms 210) radiate electromagnetic wave signals in two polarization directions.

For ease of description, in the following, one end that is of the feeding member 311 and that is connected to the first feeding layer 222 serves as a first end of the feeding member 311, and one end that is of the feeding member 311 and that is connected to the first radio frequency signal port serve as a second end of the feeding member 311.

In addition, a phase of an output end of the first feeding layer 222 may be adjusted by using the feeding member 311 of the phase shifter 310.

During specific disposition, the feeding member 311 and the first feeding layer 222 are an integrated member, so that not only the phase of the output end of the first feeding layer 222 is adjusted, but also a connection structure between the balun 220 and the phase shifter 310 is simplified. In this way, an assembly procedure between the feeding network 300 and the radiating element 200 is simplified, assembly efficiency of the entire antenna apparatus is improved, and manufacturing costs are reduced.

Because the feeding member 311 and the first feeding layer 222 each are made of a conductive metal material, the feeding member 311 and the first feeding layer 222 may be integrally injection molded, so that the feeding member 311 and the first feeding layer 222 form an integrated member.

It should be noted that the output end of the first feeding layer 222 may be the first end of the first feeding layer 222, or may be the second end of the first feeding layer 222. For example, when the antenna apparatus is a transmitting antenna, the output end of the first feeding layer 222 is the first end of the first feeding layer 222. When the antenna apparatus is a receiving antenna, the output end of the first feeding layer 222 is the second end of the first feeding layer 222.

For example, a signal phase of the first end of the first feeding layer 222 may be changed by using the phase shifter 310, to change a signal phase of a radiation arm 210 corresponding to the +45° polarization direction. In this way, when the antenna apparatus includes a plurality of radiating elements 200, a phase difference is formed between radiation arms 210 of the radiating elements 200, so that electrical downtilt of the array antenna is implemented.

During actual application, the phase shifter 310 includes a signal ground, and a medium layer is formed between the feeding member 311 and the signal ground. The phase of the output end of the first feeding layer 222 is adjusted by changing a medium layer resistance.

Figure 7:
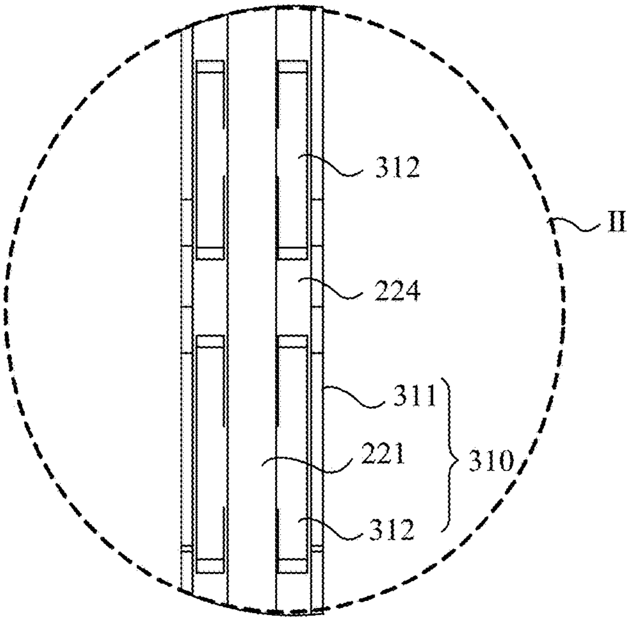
FIG. 7 is a partially enlarged view of a location II in FIG. 6.

FIG. 7 is a partially enlarged view of a location II in FIG. 6. Refer to FIG. 7. For example, the common ground layer 221 of the balun 220 serves as the signal ground of the phase shifter 310. At least a part of the feeding member 311 is disposed opposite to the common ground layer 221. Air (for example, a first air layer 224 in the following descriptions) between the feeding member 311 and the common ground layer 221 serves as the medium layer of the phase shifter 310. In this way, the feeding member 311, the air medium, and the common ground layer 221 jointly form an air microstrip structure of the phase shifter 310.

When the phase of the output end of the first feeding layer 222 needs to be adjusted, the feeding member 311 may be moved to change a projection area of the feeding member 311 on the common ground layer 221. In this way, a volume of the air medium is changed, so that the medium layer resistance of the phase shifter 310 is adjusted, and the phase of the output end of the first feeding layer 222 is adjusted. For a specific working principle of the phase shifter 310, directly refer to related content in the conventional technology. Details are not described herein again.

In this embodiment of this application, an example in which one end of the feeding member 311 is electrically connected to the second end of the first feeding layer 222 is used, so that the phase shifter 310 adjusts a phase of a radio frequency signal in the +45° polarization direction. Certainly, in some examples, one end of the feeding member 311 may alternatively be electrically connected to the second end of the second feeding layer 223, so that the phase shifter 310 adjusts a phase of a radio frequency signal in the −45° polarization direction.

Refer to FIG. 4. The feeding member 311 in this embodiment of this application may be a feeding plate, and the feeding plate and the first feeding layer 222 are located on a same plane. For example, the feeding plate and the first feeding layer 222 are located on any plane parallel to an x-z plane. In addition, the plane on which the feeding plate and the first feeding layer 222 are located is perpendicular to the reflection plate 100.

In this embodiment of this application, the feeding member 311 is configured as a feeding plate, and the feeding member 311 and the first feeding layer 222 are disposed on the same plane. In this way, a manufacturing procedure of integrally forming the feeding member 311 and the first feeding layer 222 is simplified. In other words, manufacturing difficulty of integrally forming the feeding member 311 and the first feeding layer 222 is reduced. Therefore, manufacturing efficiency of the antenna apparatus is improved. In addition, the plane on which the feeding member 311 and the first feeding layer 222 are located is perpendicular to a surface of the reflection plate 100, to avoid a case in which the feeding member 311 is coupled with the surface of the reflection plate 100, affecting transmission performance of a radio frequency signal.

During specific disposition, the feeding member 311 may include a plurality of bent parts in an extension direction of the feeding member 311 (as shown in FIG. 4). For example, the feeding member 311 has a plurality of bent parts on any plane parallel to the x-z plane, to increase an overlapping area between the feeding member 311 and the common ground layer 221 in the y direction. In this way, stability of the medium layer in the phase shifter can be improved, so that working performance of the phase shifter is ensured.

Refer to FIG. 6. In the balun 220 in this embodiment of this application, electrical isolation between the common ground layer 221 and the first feeding layer 222 and electrical isolation between the common ground layer 221 and the second feeding layer 223 may be implemented by using the air medium. For example, the first air layer 224 exists between the common ground layer 221 and the first feeding layer 222, and a second air layer 225 exists between the common ground layer 221 and the second feeding layer 223. In this way, the first feeding layer 222, the first air layer 224, and the common ground layer 221 jointly form a first air microstrip for transmitting the radio frequency signal in the +45° polarization direction, and the second feeding layer 223, the second air layer 225, and the common ground layer 221 jointly form a second air microstrip for transmitting the radio frequency signal in the −45° polarization direction. The first air microstrip and the second air microstrip jointly form an air microstrip structure of the balun 220, so that an energy loss of the radio frequency signal caused by a medium layer of the balun 220 is reduced, and radiation performance of the antenna apparatus is improved.

Refer to FIG. 6 and FIG. 7. The first air layer 224 also exists between the feeding member 311 of the phase shifter 310 and the common ground layer 221 of the balun 220. In other words, the common ground layer 221 also serves as a signal ground of the phase shifter 310, and the first air layer 224 is also a medium layer of the phase shifter 310. In this way, the feeding member 311, the first air layer 224, and the common ground layer 221 jointly form the air microstrip structure of the phase shifter 310, so that an energy loss of the radio frequency signal caused by the feeding network 300 is reduced, and manufacturing costs of the phase shifter 310 are also reduced. For example, a part of the first air layer 224 exists between the first feeding layer 222 and a part of the common ground layer 221, and another part of the first air layer 224 exists between at least a part of a first end of the feeding member 311 and another part of the common ground layer 221, so that the two parts of the first air layer 224 jointly form an air medium layer for transmitting the radio frequency signal in the +45° polarization direction. In addition, the first end of the feeding member 311 is electrically connected to the second end of the first feeding layer, so that the air microstrip structure of the phase shifter 310 is connected to the first microstrip of the balun 220, and serves as an air microstrip for transmitting the radio frequency signal in the +45° polarization direction.

For ease of understanding, the first feeding layer 222 and the feeding member 311 may be considered as a transmission line. The transmission line is located on one side of the common ground layer 221, and the first air layer 224 is formed between the transmission line and the common ground layer 221. In this way, the balun 220 and the phase shifter 310 form an interconnected air microstrip structure, in other words, the entire feeding network 300 and the balun 220 form an air microstrip structure. This reduces the energy loss of the radio frequency signal caused by the feeding network 300 and the balun 220, improves the radiation performance of the antenna apparatus, and reduces manufacturing costs of the balun 220 and the feeding network 300.

During specific disposition, the common ground layer 221 may extend along the z direction, namely, a direction perpendicular to the reflection plate 100. The first feeding layer 222 is located on one side of the common ground layer 221 along the y direction, and an orthographic projection of the first feeding layer 222 on the common ground layer 221 covers a first region of the common ground layer 221. The first feeding layer 222 may extend along the z direction, in other words, the first feeding layer 222 and the common ground layer 221 are disposed in parallel.

A part of the feeding member 311 is also located on the side of the common ground layer 221 along the y direction, and an orthographic projection of the part of the feeding member 311 on the common ground layer 221 covers a second region of the common ground layer 221. The part of the feeding member 311 may extend along the z direction, or the part of the feeding member 311 has a component in the z direction, in other words, a specific angle exists between the part of the feeding member 311 and the z direction, provided that the part of the feeding member 311 is located on the side of the common ground layer 221 along they direction. In this way, the first air layer 224 may also be formed between the feeding member 311 and the common ground layer 221.

The first region is close to the radiation arm 210, and the second region is close to the reflection plate 100.

Still refer to FIG. 4 and FIG. 6. The phase shifter 310 may further include a sliding medium 312, and at least a part of the sliding medium 312 is disposed on one side that is of the feeding member 311 and that faces the common ground layer 221. When sliding relative to the common ground layer 221, the sliding medium 312 overlaps at least a part of the first air layer 224. It may be understood that the sliding medium 312 specifically overlaps the first air layer 224 on one side of the feeding member 311. That the sliding medium 312 overlaps at least a part of the first air layer 224 means that at least a part of the sliding medium 312 enters the first air layer 224.

Refer to FIG. 4, during disposition, the sliding medium 312 may be a strip member.

In some examples, the sliding medium 312 may alternatively be a tubular member, and the sliding medium 312 is movably sleeved on a periphery of the feeding member 311. In this way, it can be ensured that a part of the sliding medium 312 is located on the side that is of the feeding member 311 and that faces the common ground layer 221, so that the part of the sliding medium 312 can slide into the first air layer 224.

Certainly, the sliding medium 312 may alternatively be a double-layer structure, the feeding member 311 is wrapped inside the double-layer structure of the sliding medium 312, and the sliding medium 312 is movably disposed on a surface of the feeding member 311. A part of the sliding medium 312 is located on the side that is of the feeding member 311 and that faces the common ground layer 221. This may ensure that a sliding medium 312 can move into the first air layer 224. A disposition manner of the sliding medium 312 is not specifically limited in this embodiment of this application.

In this embodiment of this application, an example in which the sliding medium 312 is a strip member and is movably disposed on the side that is of the feeding member 311 and that faces the common ground layer 221 is specifically used for description.

When the signal phase of the output end of the first feeding layer 222 needs to be changed, the sliding medium 312 may be moved, so that the sliding medium 312 enters the first air layer 224 between the feeding member 311 and the common ground layer 221 to overlap the first air layer 224. In this way, a medium resistance of the first air layer 224, namely, a medium layer resistance of the air microstrip corresponding to the phase shifter 310 is changed, and stable adjustment on the signal phase of the output end of the first feeding layer is performed. A different overlapping amount between the sliding medium 312 and the first air layer 224 indicates a different signal phase of the output end of the first feeding layer. Specifically, a location of the sliding medium 312 may be adjusted as required.

Refer to FIG. 4 and FIG. 6. During specific implementation, the common ground layer 221 of the balun 220 may include a first part 2211 and a second part 2212. The first part 2211 extends along the direction perpendicular to the reflection plate 100, and the second part 2212 extends along the direction parallel to the reflection plate 100. In other words, the extension direction of the first part 2211 of the common ground layer 221 is perpendicular to the reflection plate 100, that is, the extension direction of the first part 2211 is the z direction, and the extension direction of the second part 2212 of the common ground layer 221 is parallel to the reflection plate 100, that is, the extension direction of the second part 2212 is the x direction.

Based on structure disposition of the common ground layer 221, the first air layer 224 located on one side of the common ground layer 221 includes two parts. One part is perpendicular to the reflection plate 100, and the other part is parallel to the reflection plate 100. Similarly, the second air layer 225 on another side of the common ground layer 221 also includes two parts. One part is perpendicular to the reflection plate 100, and the other part is parallel to the reflection plate 100.

Figure 8:
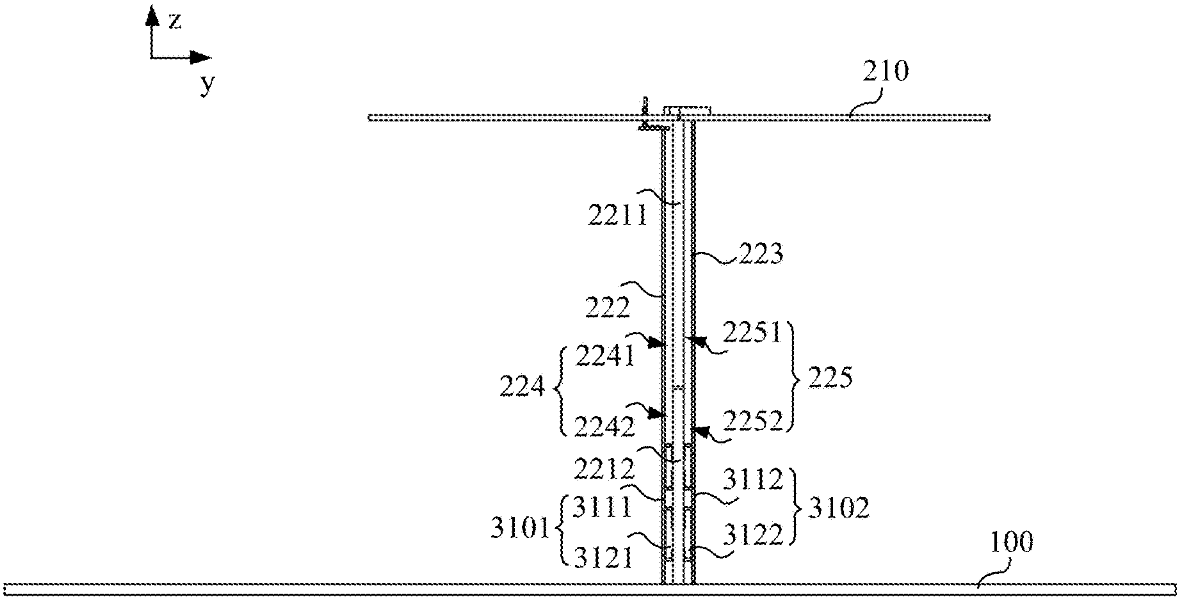
FIG. 8 is a right view of FIG. 3.

FIG. 8 is a right view of FIG. 3. Refer to FIG. 8. For example, during specific disposition, the first air layer 224 may include a first horizontal air layer 2242 and a first vertical air layer 2241 that are interconnected. The first vertical air layer 2241 exists between the first feeding layer 222 and the first part 2211, and the first horizontal air layer 2242 exists between the feeding member 311 of the phase shifter 310 and the second part 2212. Correspondingly, the second air layer 225 includes a second horizontal air layer 2252 and a second vertical air layer 2251 that are interconnected. The second vertical air layer 2251 exists between the second feeding layer 223 and the first part 2211.

It may be understood that the first vertical air layer 2241 and the second vertical air layer 2251 are perpendicular to the reflection plate 100. In other words, extension directions of the first vertical air layer 2241 and the second vertical air layer 2251 are perpendicular to the reflection plate 100. Refer to FIG. 8. For example, the extension directions of the first vertical air layer 2241 and the second vertical air layer 2251 are the z direction.

Correspondingly, the first horizontal air layer 2242 and the second horizontal air layer 2252 are parallel to the reflection plate 100. In other words, extension directions of the first horizontal air layer 2242 and the second horizontal air layer 2252 are parallel to the reflection plate 100. For example, the extension directions of the first horizontal air layer 2242 and the second horizontal air layer 2252 are the x direction (where the x direction in FIG. 8 is a direction perpendicular to a y-z plane).

Based on this, at least a part of the feeding member 311 also extends along the x direction, so that the at least a part of the feeding member 311 is disposed opposite to the second part 2212 of the common ground layer 221, and the second horizontal air layer 2252 is formed between the two parts.

For example, an extension direction of the feeding member 311 is the x direction. In this way, the first horizontal air layer 2242 is formed between the feeding member 311 and the second part 2212 in the entire extension direction.

It may be understood that the first part 2211 of the common ground layer 221 is disposed close to a radiation arm 210, and the second part 2212 of the common ground layer 221 is disposed close to the reflection plate 100. The first feeding layer 222, the first part 2211, and the first vertical air layer 2241 jointly form the air microstrip structure of the balun 220, and the feeding member 311, the second part 2212, and the first horizontal air layer 2242 jointly form the air microstrip structure of the phase shifter 310.

Refer to FIG. 4. The sliding medium 312 of the phase shifter 310 may specifically overlap at least a part of the first horizontal air layer 2242. For example, when a signal phase of the output end of the first feeding layer 222 needs to be changed, the sliding medium 312 may be moved, so that the sliding medium 312 enters the first horizontal air layer 2242 to overlap the first horizontal air layer 2242. In this way, a medium resistance of the first horizontal air layer 2242, namely, a medium layer resistance of the air microstrip corresponding to the phase shifter 310 is changed, and stable adjustment on the signal phase of the output end of the first feeding layer is performed.

In this embodiment of this application, the common ground layer 221 is set to include two parts, the first part 2211 is set to extend along the direction perpendicular to the reflection plate 100, and the second part 2212 is set to extend along the direction parallel to the reflection plate 100. In this way, the first vertical air layer 2241 may be formed between the first feeding layer 222 and the first part 2211, and the first horizontal air layer 2242 may be formed between the feeding member 311 and the second part 2212. Moving the sliding medium 312 to enable the sliding medium 312 to overlap the first horizontal air layer 2242 can not only adjust a phase of an output end of the radiating element 200, but also properly arrange the air microstrip structure of the balun 220 and the air microstrip structure of the phase shifter 310. Space of the antenna apparatus in the direction perpendicular to the reflection plate 100 is saved, and structural stability between the feeding network 300 and the radiating element 200 is further improved.

Figure 9:
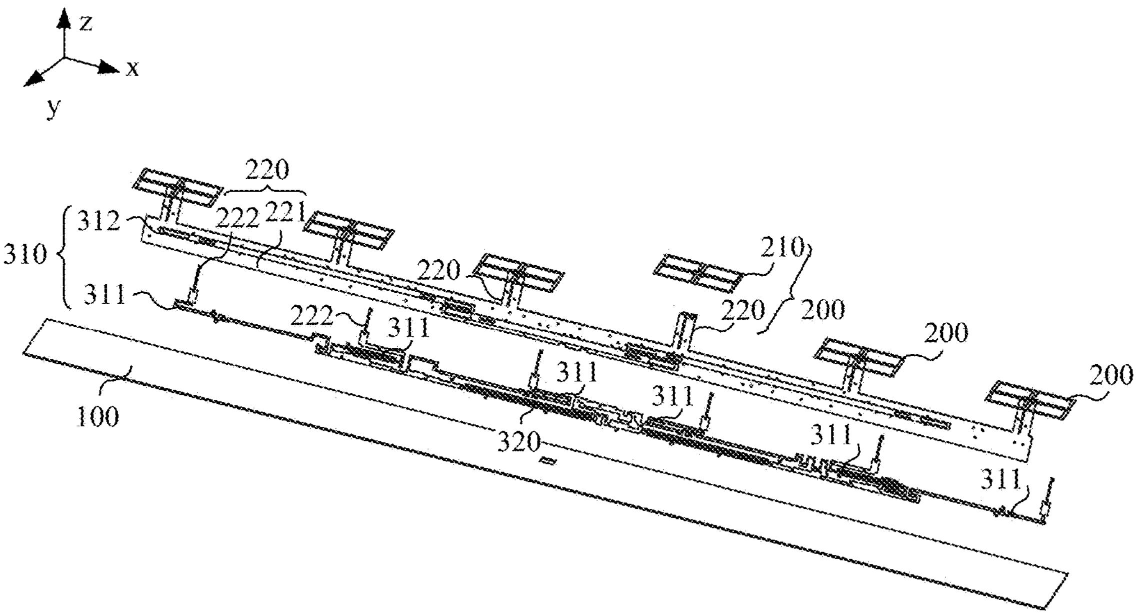
FIG. 9 is an exploded view of FIG. 3.
Figure 10:
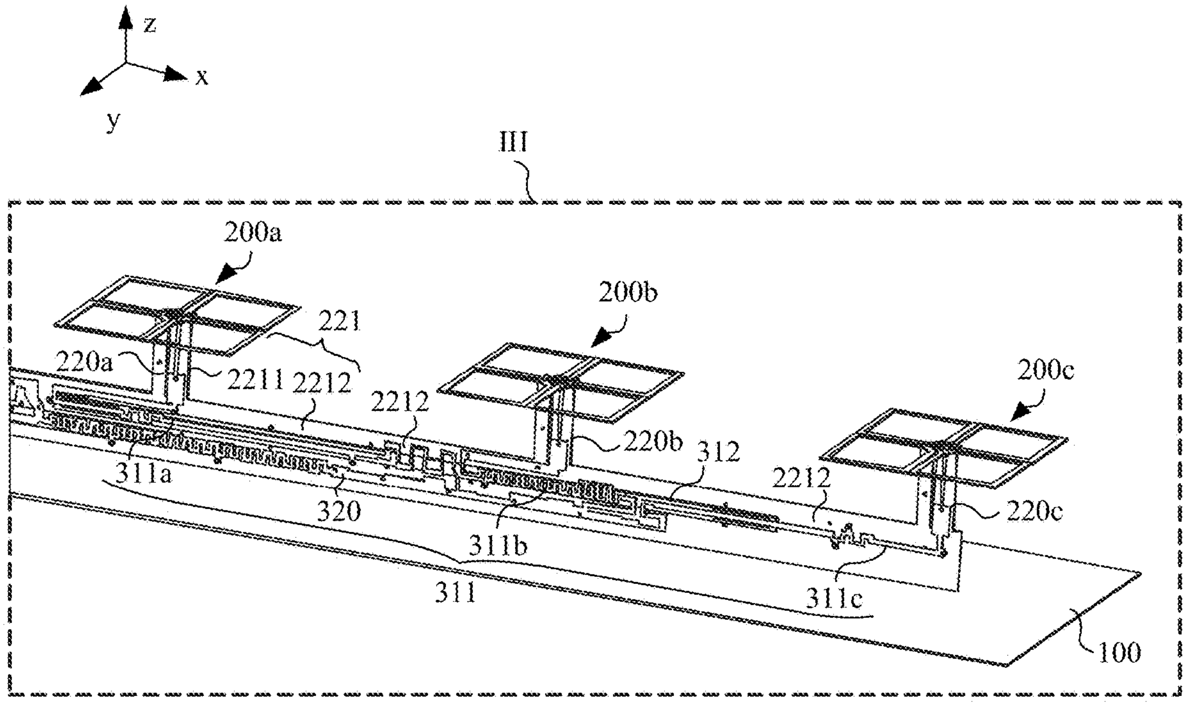
FIG. 10 is a partially enlarged view of a location III in FIG. 3.

FIG. 9 is an exploded view of FIG. 3, and FIG. 10 is a partially enlarged view of a location III in FIG. 3. Refer to FIG. 9 and FIG. 10. When the antenna apparatus includes a plurality of radiating elements 200, a phase of an output end of each radiating element 200 is adjusted by using the phase shifter 310, to form a phase difference between the radiating elements 200, and implement electrical downtilt of the antenna apparatus that serves as an array antenna.

During specific disposition, the phase shifter 310 may include a plurality of feeding members 311. The plurality of feeding members 311 are disposed in a one-to-one correspondence with baluns 220 of the plurality of radiating elements 200. A first end of each feeding member 311 is electrically connected to a second end of a first feeding layer 222 of a corresponding balun 220, to adjust a signal phase of an output end of the corresponding first feeding layer 222, so that the phase difference between the radiating elements 200 may be formed.

Refer to FIG. 10. Three radiating elements 200 disposed at intervals along the x direction are used as an example. The antenna apparatus includes a first radiating element 200*a*, a second radiating element 200*b*, and a third radiating element 200*c*. A balun 220 corresponding to the first radiating element 200*a* is a first balun 220*a*, a balun 220 corresponding to the second radiating element 200*b* is a second balun

220*b*, and a balun 220 corresponding to the third radiating element 200*c* is a third balun 220*c*.

Refer to FIG. 10. The phase shifter 310 has three feeding members 311, and the three feeding members 311 are respectively a feeding member 311*a*, a feeding member 311*b*, and a feeding member 311*c*. A first end of the feeding member 311*a* is electrically connected to a first feeding layer 222 of the first balun 220*a*, a first end of the feeding member 311*b* is electrically connected to a first feeding layer 222 of the second balun 220*b*, and a first end of the feeding member 311*c* is electrically connected to a first feeding layer 222 of the third balun 220*c*. In this way, a medium layer resistance between the three feeding members 311 and a ground of the phase shifter 310 may be changed, to adjust signal phases of output ends of the three radiating elements 200, to form a phase difference between the three radiating elements 200.

For example, a common ground layer 221 of each balun 220 separately serves as a ground of the phase shifter 310. One first air layer 224 is formed between at least a part of the feeding member 311*a* and a first common ground layer 221 corresponding to the first balun 220*a*, another first air layer 224 is formed between at least a part of the feeding member 311*b* and a second common ground layer 221 corresponding to the second balun 220*b*, and still another first air layer 224 is formed between at least a part of the feeding member 311*c* and a third common ground layer 221 corresponding to the third balun 220*c*. In this way, the phase difference may be formed between the three radiating elements 200 by changing a resistance of at least one of the three first air layers 224 corresponding to the three baluns 220.

It may be understood that the three first air layers 224 corresponding to the three baluns 220 completely overlap in the x direction (as shown in FIG. 8).

It can be learned from the foregoing that the first air layer 224 includes the first vertical air layer 2241 and the first horizontal air layer 2242. In this way, the phase difference may be formed between the three radiating elements 200 by changing a resistance of at least one of the three first air layers 224 corresponding to the three baluns 220.

Still refer to FIG. 10. During specific disposition, the phase shifter 310 may include a sliding medium 312, and the sliding medium 312 is located between any feeding member 311 and a corresponding common ground layer 221. The sliding medium 312 is moved to overlap at least one of the three first air layers 224. This changes a phase of an output end of a corresponding radiating element 200, forms the phase difference between the radiating elements 200, and implements electrical downtilt of an array antenna.

Specifically, when a part of the sliding medium 312 moves into the first air layer 224 of the first balun 220*a*, and the sliding medium 312 does not enter the first air layer 224 of the second balun 220*b* or the first air layer 224 of the third balun 220*c*, the sliding medium 312 changes a medium resistance of an air microstrip structure corresponding to the first radiating element 200. This changes a signal phase of the first radiating element 200, forms a phase difference between the output ends of the three radiating elements 200, and implements the electrical downtilt of the antenna apparatus.

For another example, when a part of the sliding medium 312 is located in the first air layer 224 of the first balun 220*a*, another part of the sliding medium 312 is located in the first air layer 224 of the second balun 220*b*, and the sliding medium 312 does not enter the first air layer 224 of the third balun 220*c*, the sliding medium 312 changes a medium resistance of an air microstrip structure corresponding to the first radiating element 200 and a medium resistance of an air microstrip structure corresponding to the second radiating element 200. This changes signal phases of the first radiating element 200 and the second radiating element 200, forms a phase difference between the output ends of the three radiating elements 200, and implements the electrical downtilt of the antenna apparatus.

For ease of description, an overlapping amount between the sliding medium 312 and the first air layer 224 of the first balun 220*a* is a first overlapping amount, and an overlapping amount between the sliding medium 312 and the first air layer 224 of the second balun 220*b* is a second overlapping amount. The first overlapping amount may be equal to or may not be equal to the second overlapping amount. When the first overlapping amount is equal to the second overlapping amount, a phase of an output end of the first radiating element 200 is equal to a phase of an output end of the second radiating element 200. On the contrary, when the first overlapping amount is not equal to the second overlapping amount, a phase of an output end of the first radiating element 200 is not equal to a phase of an output end of the second radiating element 200.

In the foregoing technical solution, a plurality of baluns 220 share one sliding medium 312. In this way, during specific operation, the one sliding medium 312 moves between the first air layers 224 on the plurality of baluns 220, to change an overlapping amount between the one sliding medium 312 and an air microstrip line corresponding to each radiating element 200. In this way, when it is ensured that the phase difference is formed between the radiating elements 200 to implement the electrical downtilt of the antenna apparatus, manufacturing costs of the phase shifter 310 are reduced.

In some examples, the phase shifter 310 may include a plurality of sliding media 312, and the plurality of sliding media 312 and the plurality of first air layers 224 are disposed in a one-to-one correspondence. For example, when the antenna apparatus includes three radiating elements 200, the phase shifter 310 includes a first sliding medium 3121, a second sliding medium 3122, and a third sliding medium 312. The first sliding medium 3121 overlaps at least a part of the first air layer 224*a* to change a medium resistance of the first air layer 224*a*, to change the signal phase of the output end of the first radiating element 200. The second sliding medium 3122 overlaps at least a part of the first air layer 224*b* to change a medium resistance of the first air layer 224*b*, to change the signal phase of the output end of the second radiating element 200. The third sliding medium 312 overlaps at least a part of the first air layer 224*c* to change a medium resistance of the first air layer 224*c*, to change the signal phase of the output end of the third radiating element 200. In this way, the phase difference is formed between the radiating elements 200, and the electrical downtilt of the array antenna is implemented.

In this embodiment of this application, the phase shifter 310 is set to include a plurality of feeding members 311, and the plurality of feeding members 311 are connected to baluns 220 of corresponding radiating elements 200. In this way, phases of the plurality of radiating elements 200 can be adjusted by using one phase shifter 310. For example, a phase difference is formed between the plurality of radiating elements 200 by using one phase shifter 310, so that electrical downtilt of each radiating element 200 in the antenna apparatus is implemented. This not only ensures radiation performance of the antenna apparatus, but also simplifies a structure of a feeding network 300, so that a structure layout of the entire feeding network 300 is simpler and more reliable.

During actual application, second ends of the plurality of feeding members 311 of the phase shifter 310 may be directly electrically connected to corresponding radio frequency signal ports.

Refer to FIG. 10. In some examples, the antenna apparatus further includes a main feeding line 320. A first end of each feeding member 311 of the phase shifter 310 is electrically connected to a corresponding first feeding layer 222, a second end of each feeding member 311 is electrically connected to the main feeding line 320, and one end of the main feeding line 320 is configured to electrically connect to a radio frequency signal port. In this way, the second end of each feeding member 311 may be electrically connected to a corresponding radio frequency signal port. For example, the second end of each feeding member 311 may be electrically connected to a first radio frequency signal port by using one main feeding line 320, so that transmission of a radio frequency signal between the first radio frequency signal port and a plurality of first feeding layers 222 can be implemented by using the main feeding line 320 and the corresponding feeding member 311.

Electrical connections between the plurality of feeding members 311 and the radio frequency signal port are implemented by using the main feeding line 320. In this way, when electrical conduction between the plurality of feeding members 311 of the phase shifter 310 and the radio frequency signal port is implemented, connection lines between the plurality of feeding members 311 and the radio frequency signal port are simplified, so that the structure layout of the entire feeding network 300 is simpler and more reliable.

Each feeding member 311 and the main feeding line 320 may be an integrated member. This further simplifies the structure of the feeding network 300 and improves assembly efficiency of the entire antenna apparatus.

Refer to FIG. 10. A second part 2212 of the common ground layer 221 may be a part that is of one end of the first part 2211 close to a reflection plate 100 and that extends in the positive direction of the x direction. A second part 2212 of the common ground layer 221 may alternatively be a part that is of one end of the first part 2211 close to a reflection plate 100 and that extends in the negative direction of the x direction. Certainly, a second part 2212 of the common ground layer 221 may alternatively be two parts that are of one end of the first part 2211 close to a reflection plate 100 and that extend in two directions (the positive direction and the negative direction) of the x direction. A specific disposition of the second part 2212 of the common ground layer 221 depends on a location of the radiating element 200 corresponding to the common ground layer 221 in the plurality of radiating elements 200.

Still refer to FIG. 10. For example, the antenna apparatus includes only the first balun 220*a*, the second balun 220*b*, and the third balun 220*c* that are disposed at intervals along the positive direction of the x direction. A common ground layer corresponding to the first balun 220*a* is a first common ground layer, a common ground layer corresponding to the second balun 220*b* is a second common ground layer, and a common ground layer corresponding to the third balun 220*c* is a third common ground layer. A second part 2212 of each common ground layer 221 extends along the x direction. For example, the second part 2212 of the first common ground layer 221, the second part 2212 of the second common ground layer 221, and the second part 2212 of the third common ground layer 221 all extend along the x direction.

The second part 2212 of the first common ground layer is a part that is of one end of the first part 2211 and that extends in the positive direction of the x direction. The second part 2212 of the second common ground layer is two parts that are of one end of the first part 2211 and that extend in the positive direction and the negative direction of the x direction. The second part 2212 of the third common ground layer is a part that is of one end of the first part 2211 and that extends in the negative direction of the x direction.

Still refer to FIG. 10. During specific disposition, in the plurality of radiating elements 200 disposed along the extension direction of the second part 2212, second parts 2212 of two adjacent common ground layers 221 are an integrated member. For example, the second part 2212 of the first common ground layer and the second part 2212 of the second common ground layer are an integrated member, and the second part 2212 of the second common ground layer and the second part 2212 of the third common ground layer are an integrated member. In this way, all common ground layers 221 of the antenna apparatus form an integrated member. In this way, when it is ensured that the radiating element 200 of the antenna apparatus is grounded, structure disposition of the radiating element 200 of the antenna apparatus is simplified, so that the assembly efficiency of the antenna apparatus is improved.

In the foregoing example, a signal phase that is in one polarization direction and that is in the radiating element 200 is adjusted by using one phase shifter 310. For example, a feeding member 311 of the phase shifter 310 is electrically connected to a first feeding layer 222 in the radiating element 200, to adjust a phase of a radio frequency signal in a +45° polarization direction. Refer to FIG. 8. The feeding network 300 in this embodiment of this application may further include two phase shifters 310. For example, the feeding network 300 includes a first phase shifter 3101 and a second phase shifter 3102, and the first phase shifter 3101 includes a first feeding member 3111 and a first sliding medium 3121. A first end of the first feeding member 3111 is electrically connected to a first feeding layer 222 of a balun 220, and the first sliding medium 3121 is located on one side that is of the first feeding member 3111 and that faces a common ground layer 221. In this way, the phase of the output end of the first feeding layer 222 is adjusted by using the first phase shifter 3101, in other words, the phase of the radio frequency signal in the +45° polarization direction is adjusted. For example, the first sliding medium 3121 is moved to enable at least a part of the first sliding medium 3121 to enter the first horizontal air layer 2242 of the first air layer 224, to change a medium resistance of the first horizontal air layer 2242 and adjust the phase of the output end of the first feeding layer 222.

Correspondingly, the second phase shifter 3102 includes a second feeding member 3112 and a second sliding medium 3122. A first end of the second feeding member 3112 is electrically connected to a second feeding layer 223 of the balun 220, and the second sliding medium 3122 is located on one side that is of the second feeding member 3112 and that faces the common ground layer 221. In this way, a phase of an output end of the second feeding layer 223 is adjusted by using the second phase shifter 3102, in other words, a phase of a radio frequency signal in a −45° polarization direction is adjusted. For example, the second sliding medium 3122 is moved to enable at least a part of the second sliding medium 3122 to enter a second horizontal air layer 2252 of a second air layer 225, to change a medium resistance of the second horizontal air layer 2252 and adjust the phase of the output end of the second feeding layer 223.

The first feeding member 3111 and the first feeding layer 222 are an integrated member, and the first air layer 224 exists between the first feeding member 3111 and the common ground layer 221. The phase of the output end of the first feeding layer 222 is adjusted by changing a medium resistance of the first air layer 224. The second feeding member 3112 and the second feeding layer 223 are an integrated member, and the second air layer 225 exists between the second feeding member 3112 and the common ground layer 221. The phase of the output end of the second feeding layer 223 is adjusted by changing a medium resistance of the second air layer 225.

It should be noted that, for a disposition manner and a working principle of the first phase shifter 3101 and a disposition manner and a working principle of the second phase shifter 3102, refer to related content of the phase shifter 310 above, and details are not described herein again.

In this embodiment of this application, two phase shifters 310 are disposed to adjust signal phases in both two polarization directions. The first phase shifter 3101 is configured to change the phase of the output end of the first feeding layer 222, and the second phase shifter 3102 is configured to change the phase of the output end of the second feeding layer 223.

In addition, the first feeding member 3111 of the first phase shifter 3101 and the first feeding layer 222 are configured as an integrated member, and the second feeding member 3112 of the second phase shifter 3102 and the second feeding layer 223 are configured as an integrated member. This further simplifies a connection procedure between the two phase shifters 310 and the balun 220, and therefore improves the assembly efficiency of the antenna apparatus.

Refer to FIG. 8. When the first phase shifter 3101 and the second phase shifter 3102 are specifically disposed, the first feeding member 3111 may be a first feeding plate, and correspondingly, the second feeding member 3112 may be a second feeding plate.

The first feeding plate and the first feeding layer 222 are located on a first plane. For example, the first feeding plate and the first feeding layer 222 are located on the first plane parallel to the x-z plane. The second feeding plate and the second feeding layer 223 are located on a second plane. For example, the second feeding plate and the second feeding layer 223 are located on the second plane parallel to the x-z plane.

It can be learned from the foregoing that the first plane and the second plane may be two planes parallel to the x-z plane, and the first plane and the second plane each are perpendicular to the reflection plate 100 of the antenna apparatus.

In this embodiment of this application, a feeding member 311 is configured as a feeding plate. For example, the first feeding member 3111 is configured as the first feeding plate, the second feeding member 3112 is configured as the second feeding plate. The feeding member 311 and a corresponding feeding layer are disposed on a same plane. This simplifies a manufacturing procedure of integrally forming the feeding member 311 and the corresponding feeding layer. In other words, manufacturing difficulty of integrally forming the feeding member 311 and the corresponding feeding layer is reduced, so that manufacturing efficiency of the antenna apparatus is improved. In addition, the first plane on which the first feeding member 3111 is located and the second plane on which the second feeding member 3112 is located each are perpendicular to a surface of the reflection plate 100, to avoid a case in which the first feeding member 3111 and the second feeding member 3112 are respectively coupled with the surface of the reflection plate 100, affecting transmission performance of the radio frequency signal.

Figure 11:
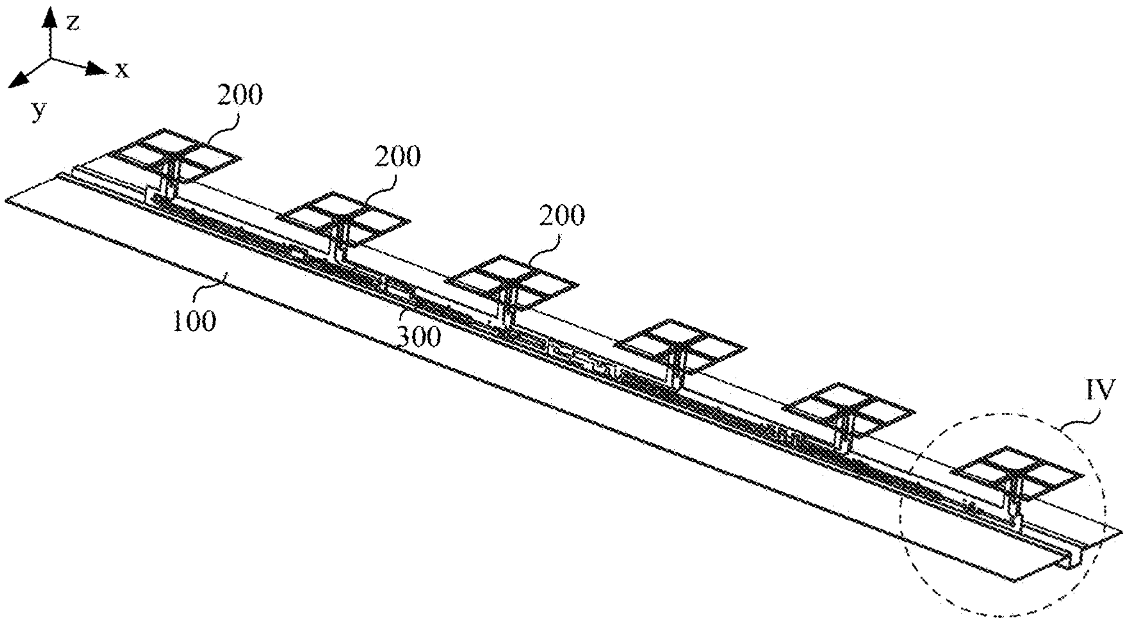
FIG. 11 is a schematic diagram of a structure of another antenna apparatus according to an embodiment of this application.
Figure 12:
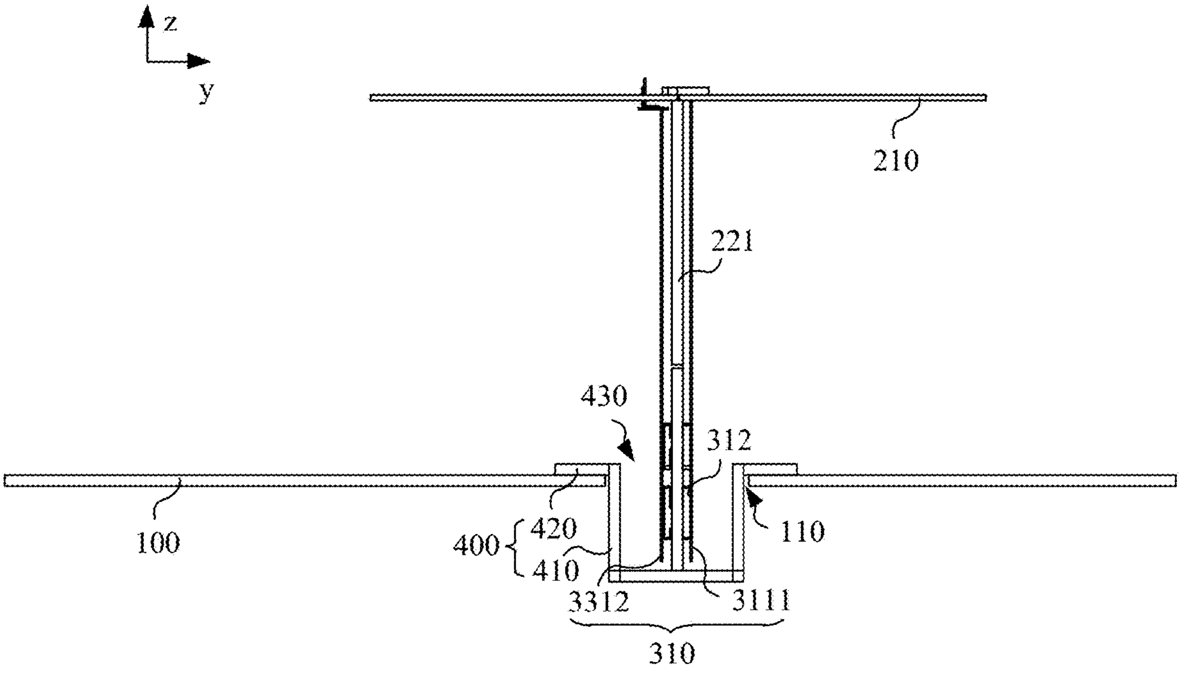
FIG. 12 is a left view of FIG. 11.
Figure 13:
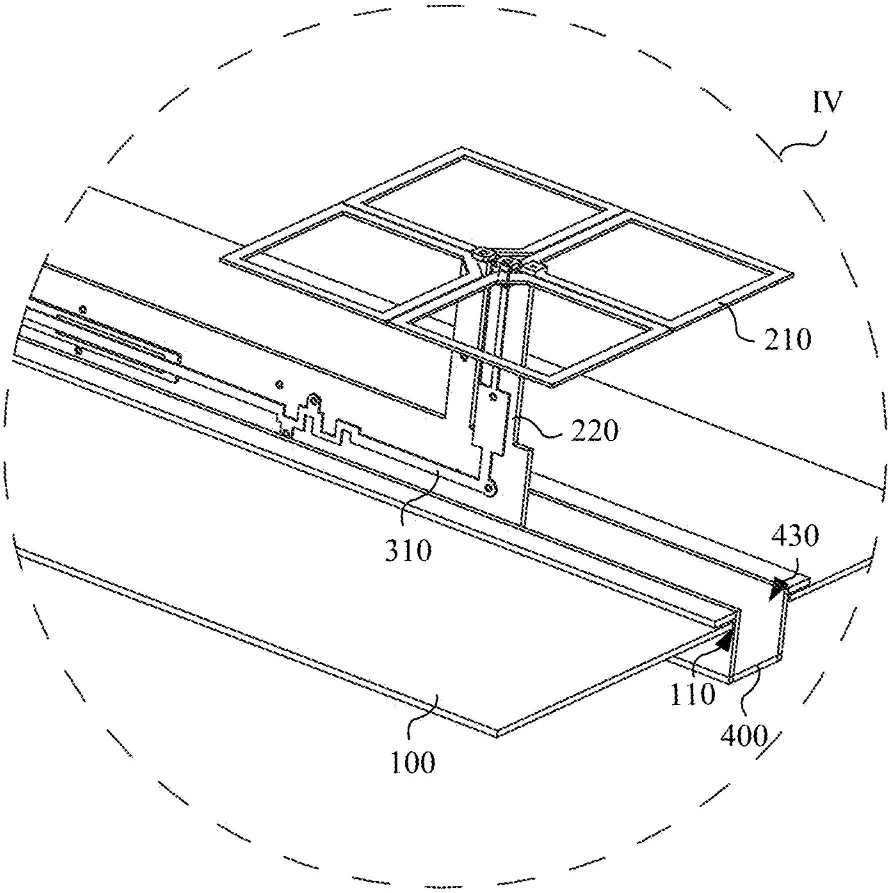
FIG. 13 is a partially enlarged view of a location IV in FIG. 11.

FIG. 11 is a schematic diagram of a structure of another antenna apparatus according to an embodiment of this application. FIG. 12 is a left view of FIG. 11, and FIG. 13 is a partially enlarged view of a location IV in FIG. 11. Refer to FIG. 11 to FIG. 13. In this embodiment of this application, a through hole 110 may be formed on a reflection plate 100, and the through hole 110 penetrates two surfaces of the reflection plate 100 along a thickness direction (refer to a z direction shown in FIG. 12). The antenna apparatus further includes a conductive housing 400 having an opening 430 on one side. The conductive housing 400 is embedded in the through hole 110. The opening 430 of the conductive housing 400 faces a radiation arm 210. One end of a balun 220 is connected to the radiation arm 210, and the other end of the balun 220 is accommodated in the conductive housing 400. For example, a first end of the balun 220 is connected to the radiation arm 210, and at least a part of a second end of the balun 220 is accommodated in the conductive housing 400. In this way, a part of an electromagnetic wave signal radiated by the balun 220 to the outside can be blocked by the conductive housing 400, and does not leak to the outside, so that a loss of the balun 220 in a radio frequency signal transmission process is reduced.

In addition, the reflection plate 100 includes a first side and a second side that are disposed opposite to each other along the z direction. The second end of the balun 220 is accommodated in the conductive housing 400 of the through hole 110, so that a part (for example, a side of the radiation arm 210) of the balun 220 is located on the first side of the reflection plate 100, and another part (for example, a part of a phase shifter 310) of the balun 220 is located on the second side of the reflection plate 100. A spacing between the radiation arm 210 and the reflection plate 100 is shortened. In this way, vertical space on the first side of the reflection plate 100 is saved, and an antenna structure on the reflection plate 100 is more stable, so that radiation performance of the antenna apparatus is ensured.

Refer to FIG. 12. A part of the phase shifter 310 is accommodated in the conductive housing 400. For example, a part of a common ground layer 221, a first feeding member 3111, a second feeding member 3112, and a part of a corresponding sliding medium 312 are all accommodated in the conductive housing 400. This further reduces a loss of the phase shifter 310 in a radio frequency signal transmission process, and improves accuracy of phase adjustment performed by the phase shifter 310.

It should be noted that, when the antenna apparatus includes a plurality of radiating elements 200 that are disposed at intervals along an x direction, the through hole 110 in the reflection plate 100 may extend from one end of the reflection plate 100 to the other end of the reflection plate 100 along the x direction, so that one end of the plurality of radiating elements 200 disposed along the x direction is accommodated in the conductive housing 400 of the through hole 110.

A row of radiating elements 200 that are disposed at intervals along the x direction may be disposed on the reflection plate 100. Alternatively, a plurality of rows of radiating elements 200 may be disposed on the reflection plate 100, and the plurality of rows of radiating elements 200 are disposed at intervals along a y direction. Refer to FIG. 8 and FIG. 10. When there is a row of radiating elements 200 on the reflection plate 100, there may be one through hole 110, and the through hole 110 may extend from one end of the reflection plate 100 to the other end of the reflection plate 100 along the x direction, so that second ends of the row of radiating elements 200 are all accommodated in the conductive housing 400 of the through holes 110. The second end of the radiating element 200 faces a same direction as the second end of the balun 220.

When there are a plurality of rows of radiating elements 200 (not shown in the FIG. on the reflection plate 100, there may be a plurality of through holes 110, and the plurality of through holes 110 are arranged at intervals along the y direction, so that the plurality of through holes 110 are arranged in a one-to-one correspondence with the plurality of rows of radiating elements 200. For example, second ends of one row of radiating elements 200 are located in one through hole 110, and second ends of another row of radiating elements 200 are located in another through hole 110.

The conductive housing 400 is electrically connected to the reflection plate 100, and the other end of the common ground layer 221, for example, a second end of the common ground layer 221, is electrically connected to the conductive housing 400. In this way, the second end of the common ground layer 221 is electrically connected to the reflection plate 100, so that the common ground layer 221 is ensured to be grounded. The second end of the common ground layer 221 may be understood as one side that is of a second part 2212 of the common ground layer 221 and that faces the reflection plate 100.

Refer to FIG. 12. During specific disposition, the conductive housing 400 may include a main body part 410 and a connection part 420. The main body part 410 is embedded in the through hole 110. The opening 430 is formed on one side of the main body part 410. At least a part of the balun 220 is located in the main body part 410, and one end of the balun 220 is connected to an inner wall that is of the main body part 410 and that faces the opening 430.

Refer to FIG. 12 and FIG. 13. For example, a part of the phase shifter 310 is located in the main body part 410, and the second end of the common ground layer 221 of the balun 220 is electrically connected to an inner bottom wall of the main body part 410 (as shown in FIG. 12). The inner bottom wall of the main body part 410 faces the opening 430 of the main body part 410.

The connection part 420 is disposed at one end of the main body part 410 having the opening 430, and the connection part 420 abuts against a surface of one side that is of the reflection plate 100 and that faces a radiator. For example, the connection part 420 abuts against a surface of the first side of the reflection plate 100.

It may be understood that the connection part 420 may be bonded to the surface of the first side of the reflection plate 100 by using a conductive adhesive, or may be fastened to the surface of the first side of the reflection plate 100 by using a fastener such as a screw. A connection manner between the connection part 420 and the reflection plate 100 is not limited herein, provided that the connection part 420 is fastened to the reflection plate 100 and the connection part 420 is electrically connected to the reflection plate 100.

An embodiment of this application further provides a communication device, including a radio frequency circuit and the antenna apparatus in any one of the foregoing examples. The radio frequency circuit is electrically connected to the antenna apparatus.

The radio frequency circuit may provide a signal source for the antenna apparatus. For example, a feeding member 311 of the antenna apparatus is electrically connected to a first radio frequency signal port in the radio frequency circuit, so that transmission of a radio frequency signal in a +45° polarization direction is implemented between the first radio frequency signal port and a first feeding layer 222 in the antenna apparatus. Correspondingly, a second feeding layer 223 of the antenna apparatus is electrically connected to a second radio frequency signal port in the radio frequency circuit, so that transmission of a radio frequency signal in a −45° polarization direction is implemented between the second radio frequency signal port and the second feeding layer 223 of the antenna apparatus.

The radio frequency circuit is usually disposed in a radio remote unit. For specific circuit disposition and working principles of the radio frequency circuit, directly refer to related content in the conventional technology. Details are not described herein again.

For example, second ends of a plurality of first feeding members 3111 in the antenna apparatus are electrically connected to the first radio frequency signal port, so that the radio frequency signal in the +45° polarization direction sent by the first radio frequency signal port is transmitted to the first feeding layer 222 of the antenna apparatus, and then a radiation arm 210 at a first end of the first feeding layer 222 transmits the signal to the outside in an electromagnetic wave manner, to complete transmission of the signal.

According to the communication device provided in this embodiment of this application, the radio frequency circuit is electrically connected to the antenna apparatus, so that a structure of the antenna apparatus is simplified, assembly efficiency of the entire antenna apparatus is improved, and manufacturing costs are reduced.

It should be noted that the communication device in this embodiment of this application may alternatively be a communication base station.

Embodiment 2

Figure 14:
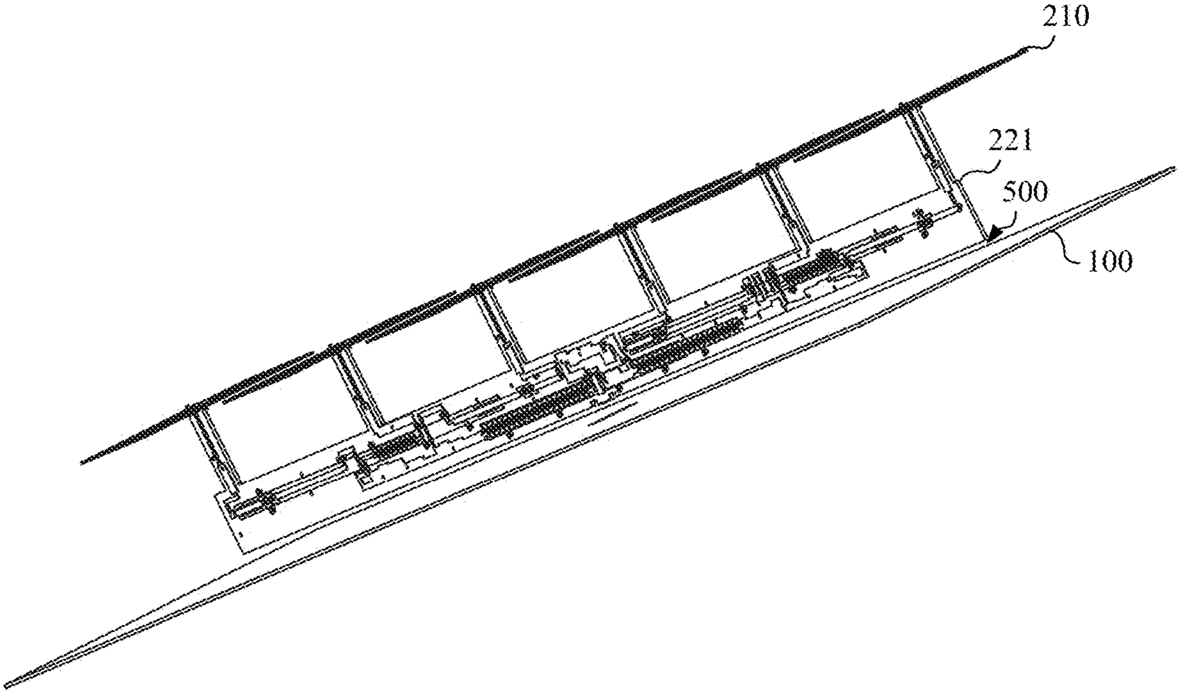
FIG. 14 is a schematic diagram of a structure of still another antenna apparatus according to an embodiment of this application.
Figure 15:
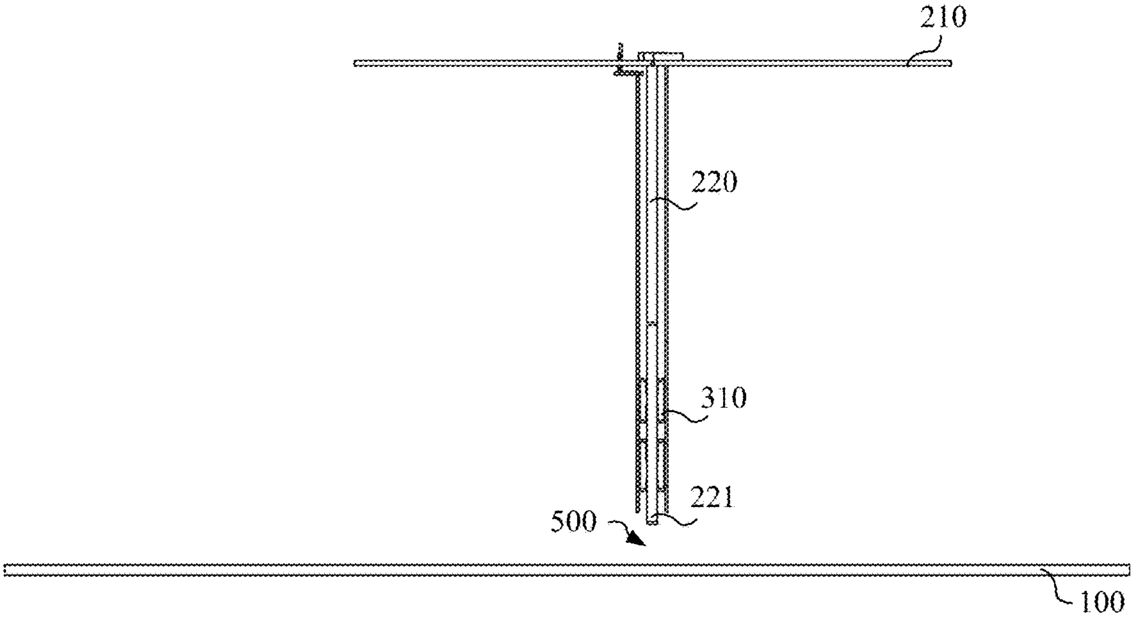
FIG. 15 is a right view of FIG. 14.

FIG. 14 is a schematic diagram of a structure of still another antenna apparatus according to an embodiment of this application, and FIG. 15 is a right view of FIG. 14. Refer to FIG. 14 and FIG. 15. A difference from Embodiment 1 is that in a radiating element 200 in this embodiment of this application, a second end of a balun 220 is disposed above one surface of a reflection plate 100 in a suspended manner, to simplify an assembly procedure of the balun 220.

Specifically, a common ground layer 221 of the balun 220 is disposed above the reflection plate 100 in a suspended manner. In other words, the common ground layer 221 may not be grounded. For example, a gap 500 exists between a second end of the common ground layer 221 and the reflection plate 100. For other technical solutions in Embodiment 2, refer to Embodiment 1, and details are not described herein again.

In the descriptions of embodiments of this application, it should be noted that, unless otherwise clearly specified and limited, terms "mount", "connect", and "connection" should be understood in a broad sense. For example, the terms may be used for a fixed connection, an indirect connection through an intermediate medium, an internal connection between two elements, or an interaction relationship between two elements. A person of ordinary skill in the art may understand specific meanings of the terms in embodiments of this application based on a specific case.

In the specification, claims, and accompanying drawings of embodiments of this application, the terms "first", "second", "third", "fourth", and the like (if any) are intended to distinguish between similar objects but do not necessarily indicate a specific order or sequence.

What is claimed is:

1. An antenna apparatus, comprising a reflection plate, a radiating element, and a feeding network, wherein the radiating element is disposed on the reflection plate and comprises a balun and at least two radiation arms located at one end of the balun, wherein the balun comprises a first feeding layer, a common ground layer, and a second feeding layer that are disposed in that sequence, the feeding network comprises a phase shifter, and the phase shifter comprises a feeding member;

one end of the common ground layer is electrically connected to one of the radiation arms, and an opposite end of the common ground layer is electrically connected to the reflection plate, or the opposite end of the common ground layer is disposed above the reflection plate in a suspended manner; and one end of the first feeding layer and one end of the second feeding layer are electrically connected to another one of the radiation arms, the opposite end of the first feeding layer is electrically connected to the feeding member, and the feeding member and the first feeding layer are an integrated member.

2. The antenna apparatus according to claim 1, wherein the radiating element has only one balun.

3. The antenna apparatus according to claim 1, wherein a first air layer exists between the common ground layer and the first feeding layer, and a second air layer exists between the common ground layer and the second feeding layer; and the first air layer exists between the feeding member and the common ground layer.

4. The antenna apparatus according to claim 3, wherein the phase shifter further comprises a sliding medium, and at least a part of the sliding medium is slidably disposed on one side that is of the feeding member and that faces the common ground layer; and when sliding relative to the common ground layer, the sliding medium overlaps at least a part of the first air layer.

5. The antenna apparatus according to claim 4, wherein the common ground layer comprises a first part and a second part, the first part extends along a direction perpendicular to the reflection plate, and the second part extends along a direction parallel to the reflection plate;

the first air layer comprises a first horizontal air layer and a first vertical air layer that are connected to each other, wherein the first vertical air layer exists between the first feeding layer and the first part; and the second air layer comprises a second horizontal air layer and a second vertical air layer that are connected to each other, wherein the second vertical air layer exists between the second feeding layer and the first part; and the first horizontal air layer exists between the feeding member and the second part, and the sliding medium overlaps at least a part of the first horizontal air layer.

6. The antenna apparatus according to claim 5, wherein the antenna apparatus comprises a plurality of radiating elements, and the plurality of radiating elements are disposed at intervals on the reflection plate; and wherein the plurality of radiating elements are disposed along an extension direction of the second part, and second parts of two adjacent common ground layers are an integrated member.

7. The antenna apparatus according to claim 3, wherein the feeding network comprises a first phase shifter and a second phase shifter, the first phase shifter comprises a first feeding member, and the second phase shifter comprises a second feeding member; and the first feeding member and the first feeding layer are an integrated member, and the first air layer exists between the first feeding member and the common ground layer; and the second feeding member and the second feeding layer are an integrated member, and the second air layer exists between the second feeding member and the common ground layer.

8. The antenna apparatus according to claim 7, wherein the first feeding member is a first feeding plate, and the second feeding member is a second feeding plate;

the first feeding plate and the first feeding layer are located on a first plane, and the second feeding plate and the second feeding layer are located on a second plane; and the first plane and the second plane each are perpendicular to the reflection plate of the antenna apparatus.

9. The antenna apparatus according to claim 1, wherein the antenna apparatus further comprises a conductive housing having an opening on one side, the reflection plate has a through hole, the conductive housing is embedded in the through hole, the opening faces the radiation arm, one end of the balun is connected to the radiation arm, and the other end of the balun is accommodated in the conductive housing; and that the other end of the common ground layer is electrically connected to the reflection plate comprises: the other end of the common ground layer is electrically connected to the conductive housing, and the conductive housing is electrically connected to the reflection plate.

10. The antenna apparatus according to claim 1, wherein the balun comprises an insulating body and three layers of sheet metal; and the three layers of sheet metal are disposed at intervals, and the insulating body exists between two adjacent layers of sheet metal, wherein one layer of sheet metal located in the middle is the common ground layer, and two layers of sheet metal located on two sides are respectively the first feeding layer and the second feeding layer.

11. The antenna apparatus according to claim 1, wherein there are a plurality of radiating elements, and the plurality of radiating elements are arranged in an array; and the phase shifter comprises a plurality of feeding members, and the plurality of feeding members are disposed in a one-to-one correspondence with baluns of the plurality of radiating elements.

12. A communication device, comprising a radio frequency circuit and an antenna apparatus, wherein the antenna apparatus comprises a reflection plate, a radiating element, and a feeding network, the radiating element is disposed on the reflection plate and comprises a balun and at least two radiation arms located at one end of the balun, wherein the balun comprises a first feeding layer, a common ground layer, and a second feeding layer that are disposed in that sequence, the feeding network comprises a phase shifter, and the phase shifter comprises a feeding member;

one end of the common ground layer is electrically connected to one of the radiation arms, and an opposite end of the common ground layer is electrically connected to the reflection plate, or the opposite end of the common ground layer is disposed above the reflection plate in a suspended manner; and one end of the first feeding layer and one end of the second feeding layer are electrically connected to another one of the radiation arms, the opposite end of the first feeding layer is electrically connected to the feeding member, and the feeding member and the first feeding layer are an integrated member.

13. The communication device according to claim 12, wherein the radiating element has only one balun.

14. The communication device according to claim 12, wherein a first air layer exists between the common ground layer and the first feeding layer, and a second air layer exists between the common ground layer and the second feeding layer; and the first air layer exists between the feeding member and the common ground layer.

15. The communication device according to claim 14, wherein the phase shifter further comprises a sliding medium, and at least a part of the sliding medium is slidably disposed on one side that is of the feeding member and that faces the common ground layer; and when sliding relative to the common ground layer, the sliding medium overlaps at least a part of the first air layer.

16. The communication device according to claim 15, wherein the common ground layer comprises a first part and a second part, the first part extends along a direction perpendicular to the reflection plate, and the second part extends along a direction parallel to the reflection plate;

the first air layer comprises a first horizontal air layer and a first vertical air layer that are connected to each other, wherein the first vertical air layer exists between the first feeding layer and the first part; and the second air layer comprises a second horizontal air layer and a second vertical air layer that are connected to each other, wherein the second vertical air layer exists between the second feeding layer and the first part; and the first horizontal air layer exists between the feeding member and the second part, and the sliding medium overlaps at least a part of the first horizontal air layer.

17. The communication device according to claim 16, wherein the antenna apparatus comprises a plurality of radiating elements, and the plurality of radiating elements are disposed at intervals on the reflection plate; and wherein the plurality of radiating elements are disposed along an extension direction of the second part, and second parts of two adjacent common ground layers are an integrated member.

18. The communication device according to claim 14, wherein the feeding network comprises a first phase shifter and a second phase shifter, the first phase shifter comprises a first feeding member, and the second phase shifter comprises a second feeding member; and the first feeding member and the first feeding layer are an integrated member, and the first air layer exists between the first feeding member and the common ground layer; and the second feeding member and the second feeding layer are an integrated member, and the second air layer exists between the second feeding member and the common ground layer.

19. The communication device according to claim 18, wherein the first feeding member is a first feeding plate, and the second feeding member is a second feeding plate;

the first feeding plate and the first feeding layer are located on a first plane, and the second feeding plate and the second feeding layer are located on a second plane; and the first plane and the second plane each are perpendicular to the reflection plate of the antenna apparatus.

20. The communication device according to claim 12, wherein the antenna apparatus further comprises a conductive housing having an opening on one side, the reflection plate has a through hole, the conductive housing is embedded in the through hole, the opening faces the radiation arm, one end of the balun is connected to the radiation arm, and the other end of the balun is accommodated in the conductive housing; and that the other end of the common ground layer is electrically connected to the reflection plate comprises: the other end of the common ground layer is electrically connected to the conductive housing, and the conductive housing is electrically connected to the reflection plate.

* * * * *